(12) United States Patent
Ko

(10) Patent No.: US 10,606,001 B1
(45) Date of Patent: Mar. 31, 2020

(54) OPTICAL FIBER TRANSCEIVER

(71) Applicant: YEAR ROUND Technology Corp., New Taipei (TW)

(72) Inventor: Hung-Jung Ko, New Taipei (TW)

(73) Assignee: YEAR ROUND TECHNOLOGY CORP., New Taipei (TW)

( * ) Notice: Subject to any disclaimer, the term of this patent is extended or adjusted under 35 U.S.C. 154(b) by 0 days.

(21) Appl. No.: 16/366,720

(22) Filed: Mar. 27, 2019

(51) Int. Cl.
*G02B 6/42* (2006.01)

(52) U.S. Cl.
CPC ......... *G02B 6/4278* (2013.01); *G02B 6/4246* (2013.01)

(58) Field of Classification Search
CPC .................................................. G02B 6/4278
USPC ............................................................ 385/88
See application file for complete search history.

(56) References Cited

U.S. PATENT DOCUMENTS

| | | | | |
|---|---|---|---|---|
| 9,146,366 B2* | 9/2015 | Koutrokois | .......... | G02B 6/4246 |
| 9,523,826 B2* | 12/2016 | Tsai | ........................ | G02B 6/423 |
| 9,551,847 B2* | 1/2017 | Wang | ..................... | G02B 6/423 |
| 9,720,189 B1* | 8/2017 | Wang | ..................... | G02B 6/387 |
| 9,929,500 B1* | 3/2018 | Ista | ........................ | G02B 6/4261 |
| 2004/0033027 A1* | 2/2004 | Pang | .................... | G02B 6/3825 |
| | | | | 385/53 |
| 2014/0104808 A1* | 4/2014 | Koutrokois | .......... | G02B 6/4246 |
| | | | | 361/818 |

* cited by examiner

*Primary Examiner* — Sung H Pak
(74) *Attorney, Agent, or Firm* — Guice Patents PLLC

(57) ABSTRACT

An optical fiber transceiver includes: a cartridge, formed with two opposite sidewalls and a front end thereof disposed with an insertion part, wherein each sidewall is transversally formed with a runner; and a sliding member, formed with a pair of extending arms inserted in the pair of runners, wherein bottom ends defined at front portions of the pair of extending arms are connected via a connecting sheet, and rear ends thereof are protrudingly disposed with a pair of unlocking flanges; wherein, a top surface of the connecting sheet and a bottom surface of the insertion part are oppositely disposed with an elastic member and an abutting unit, two sides of the elastic member have a pair of elastic arms, and two sides of the abutting unit respectively have a guiding part symmetrically arranged and allowing each elastic arm to be in contact and displaced thereon.

38 Claims, 20 Drawing Sheets

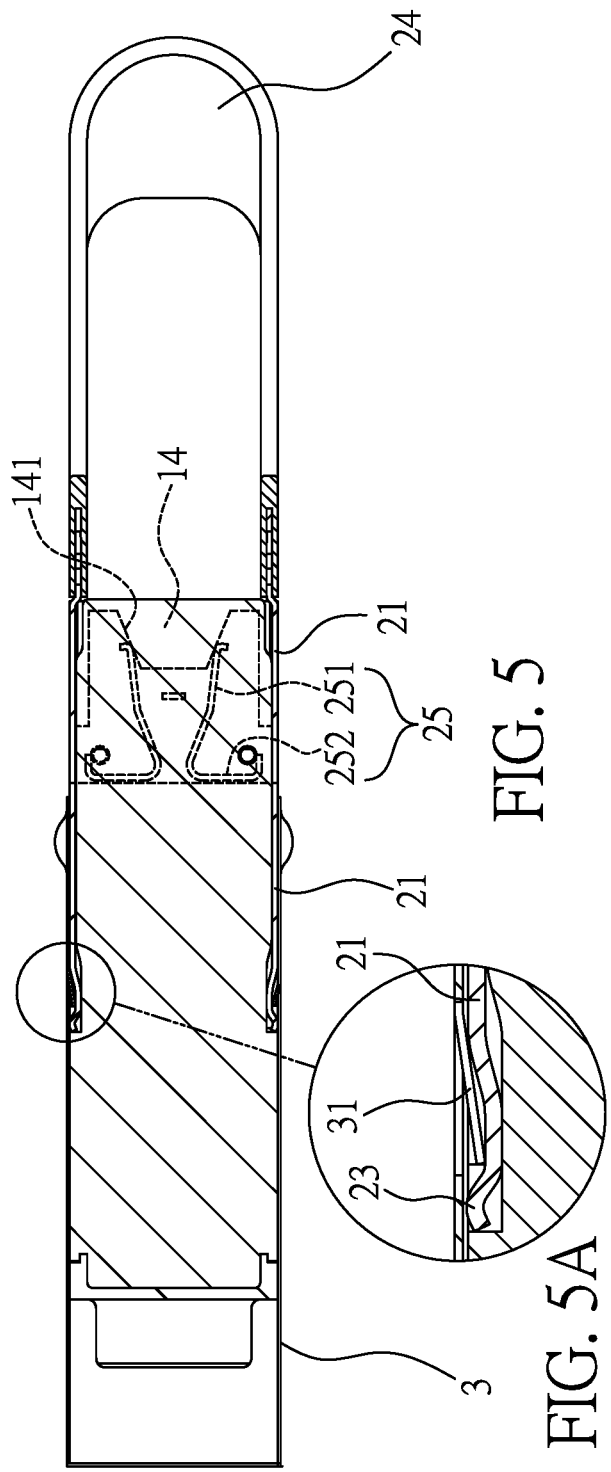
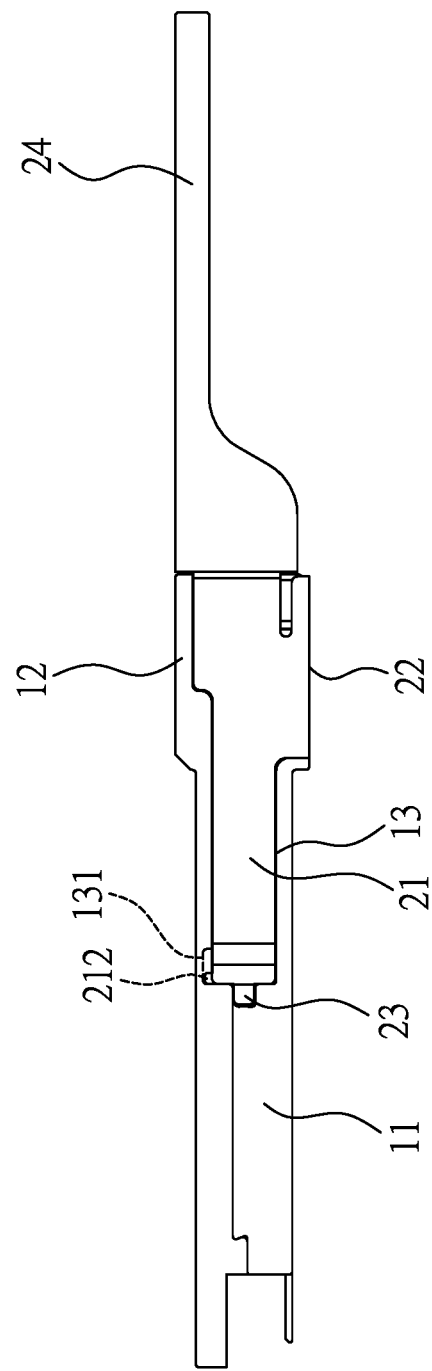

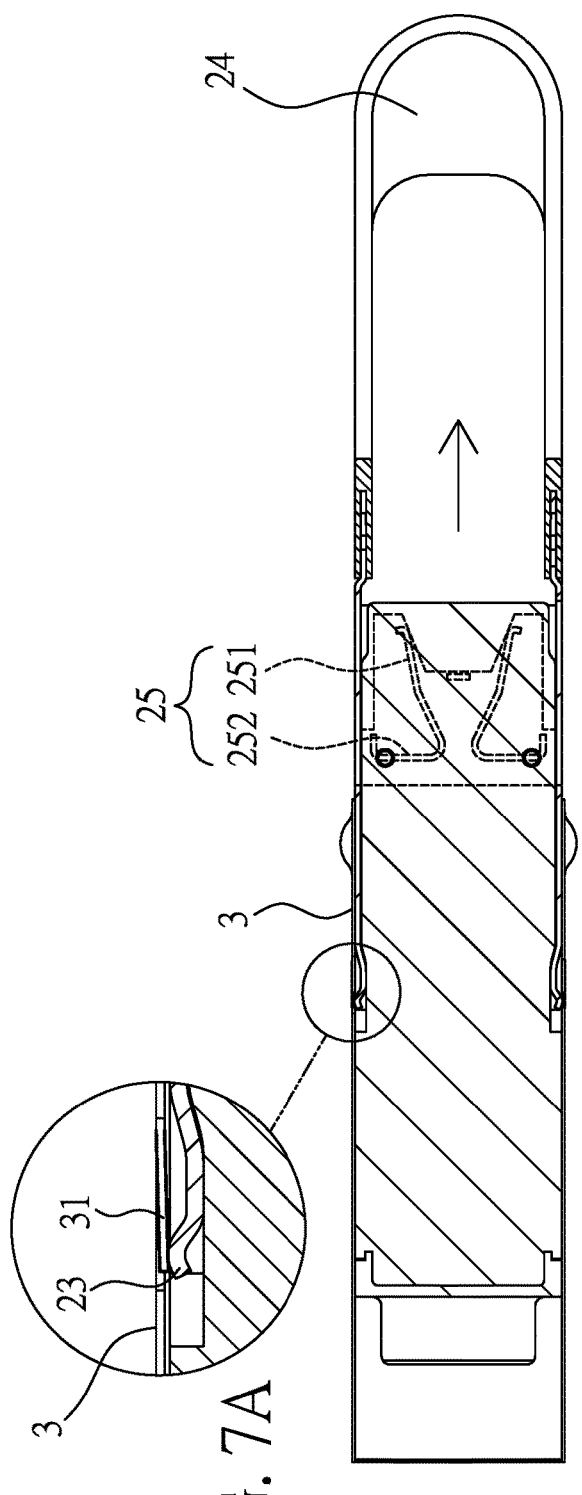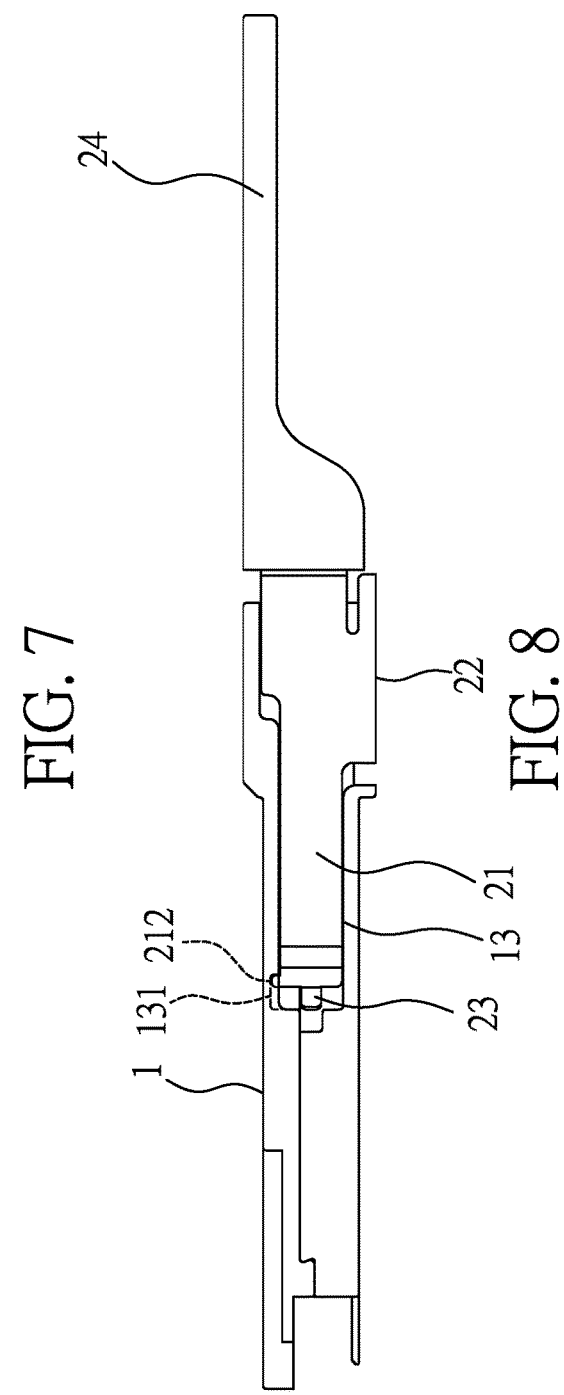

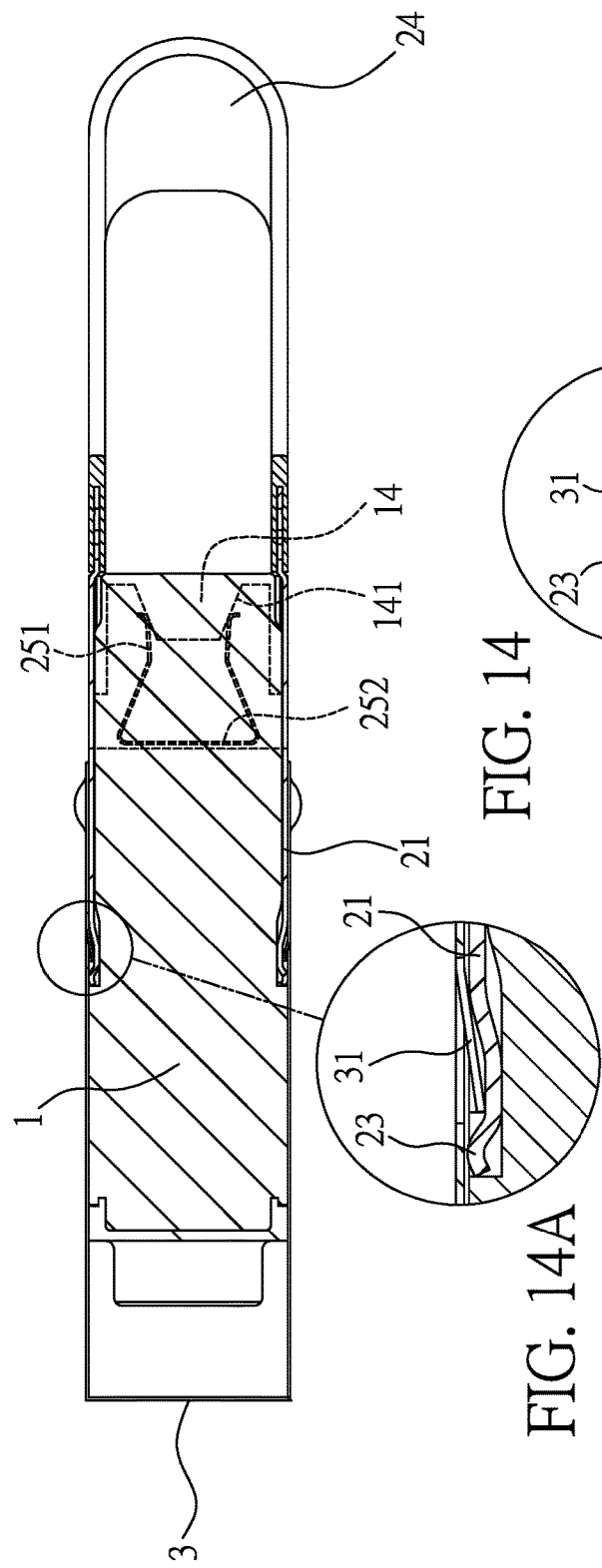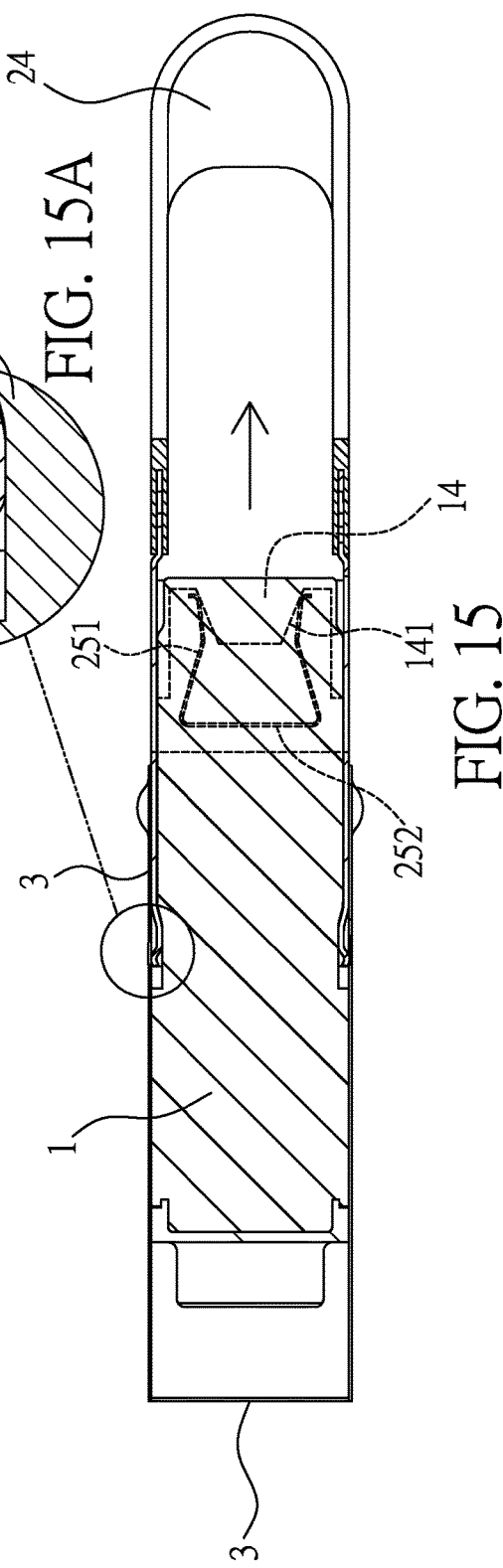

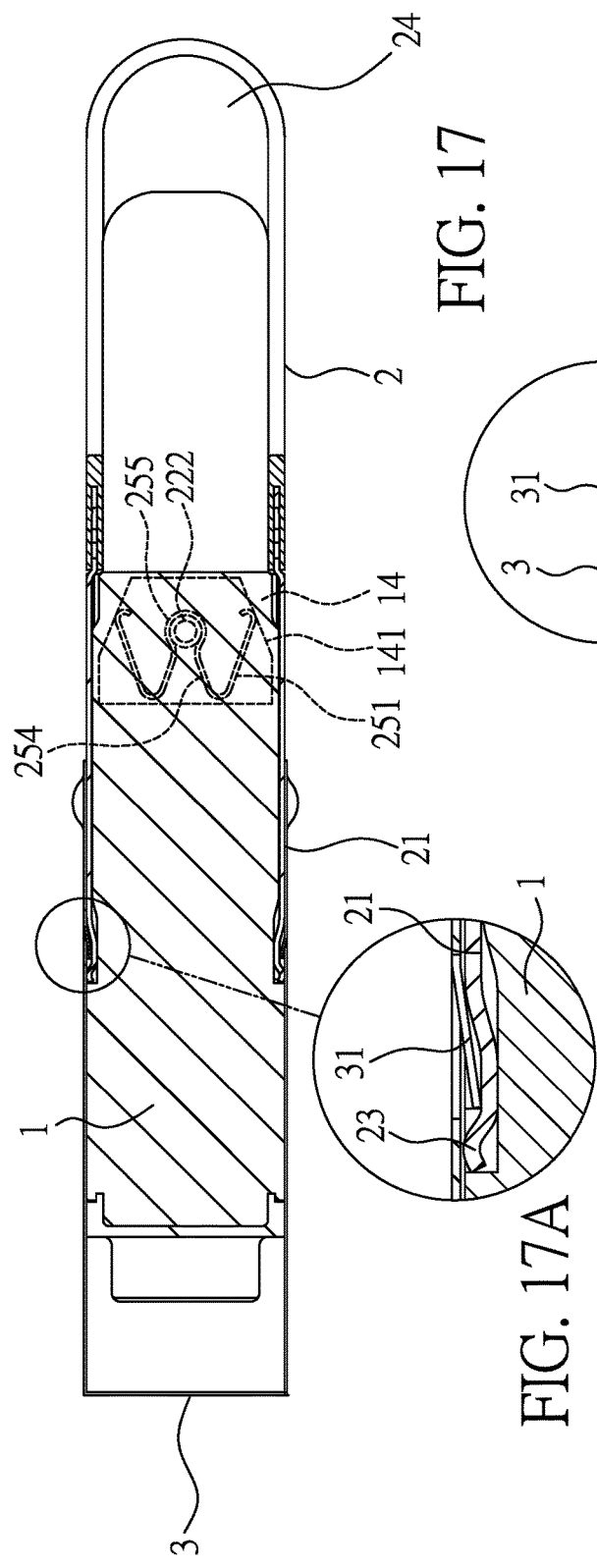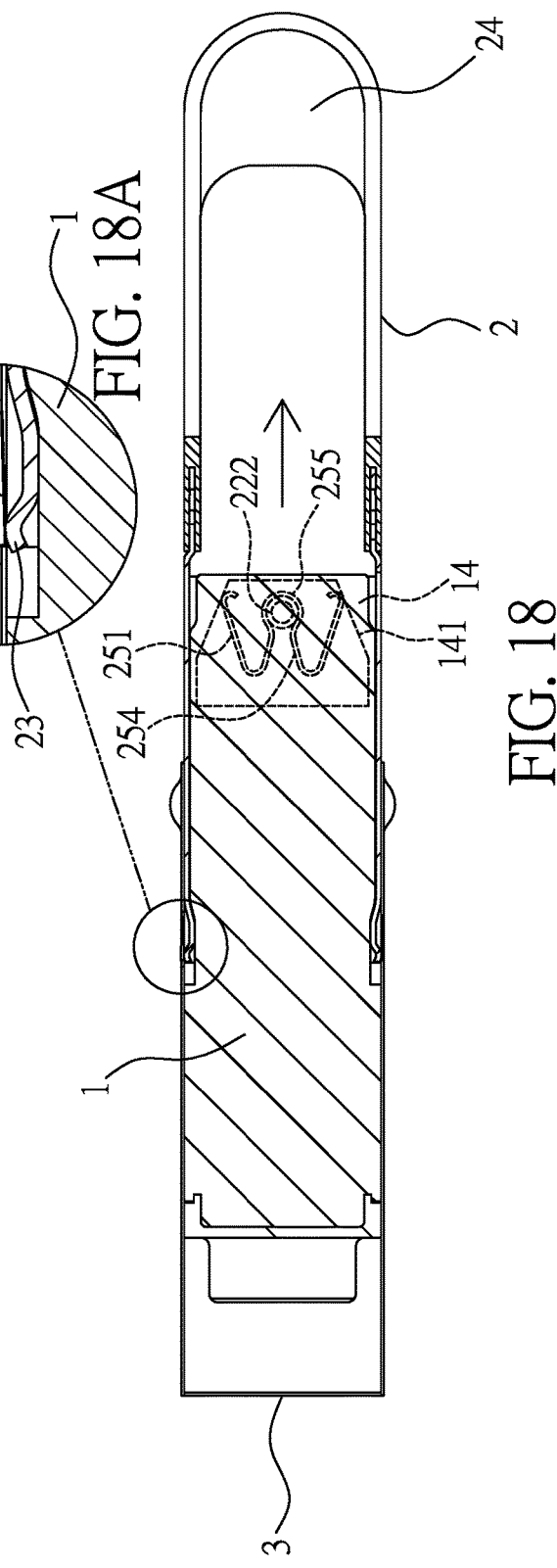

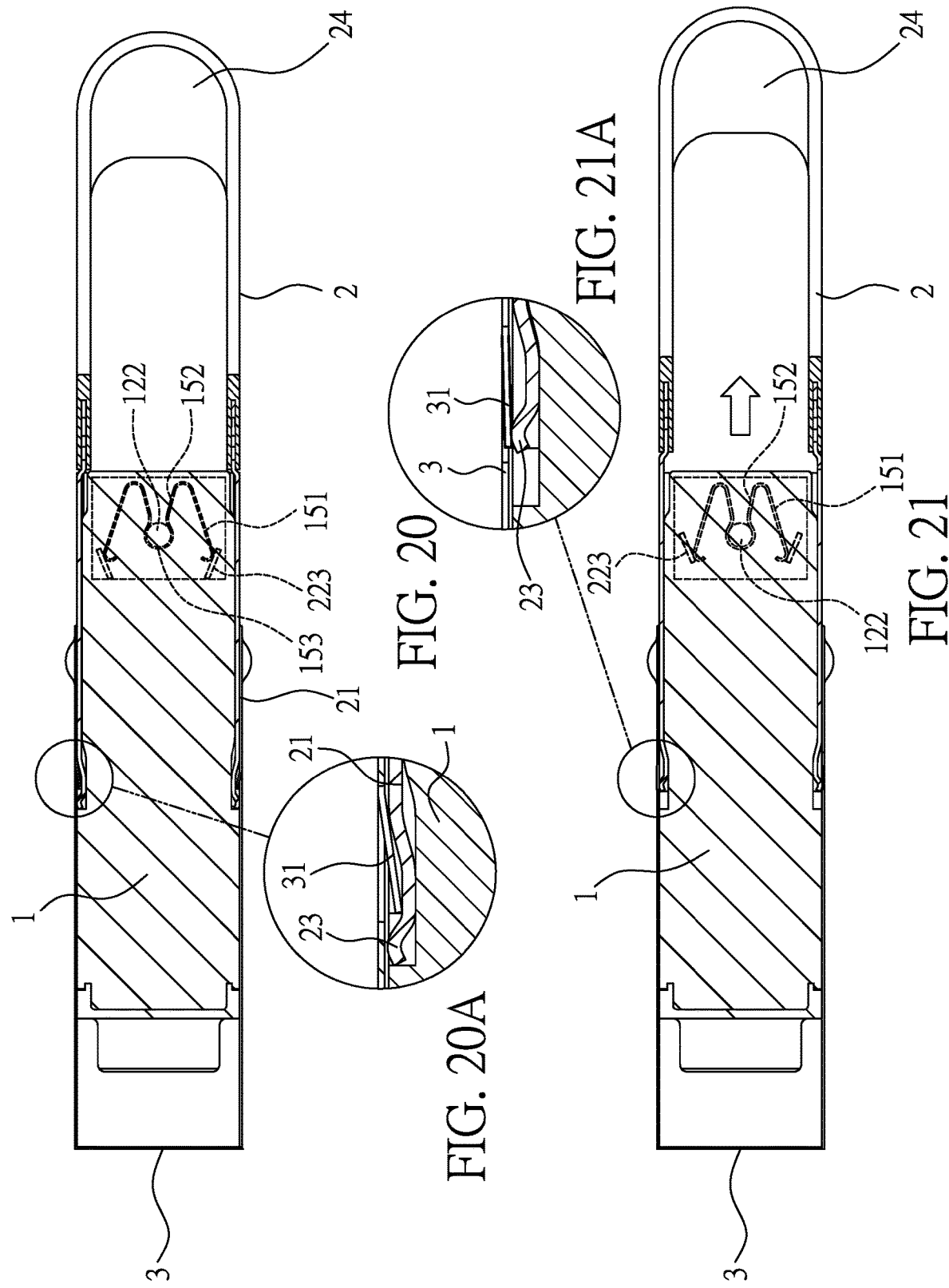

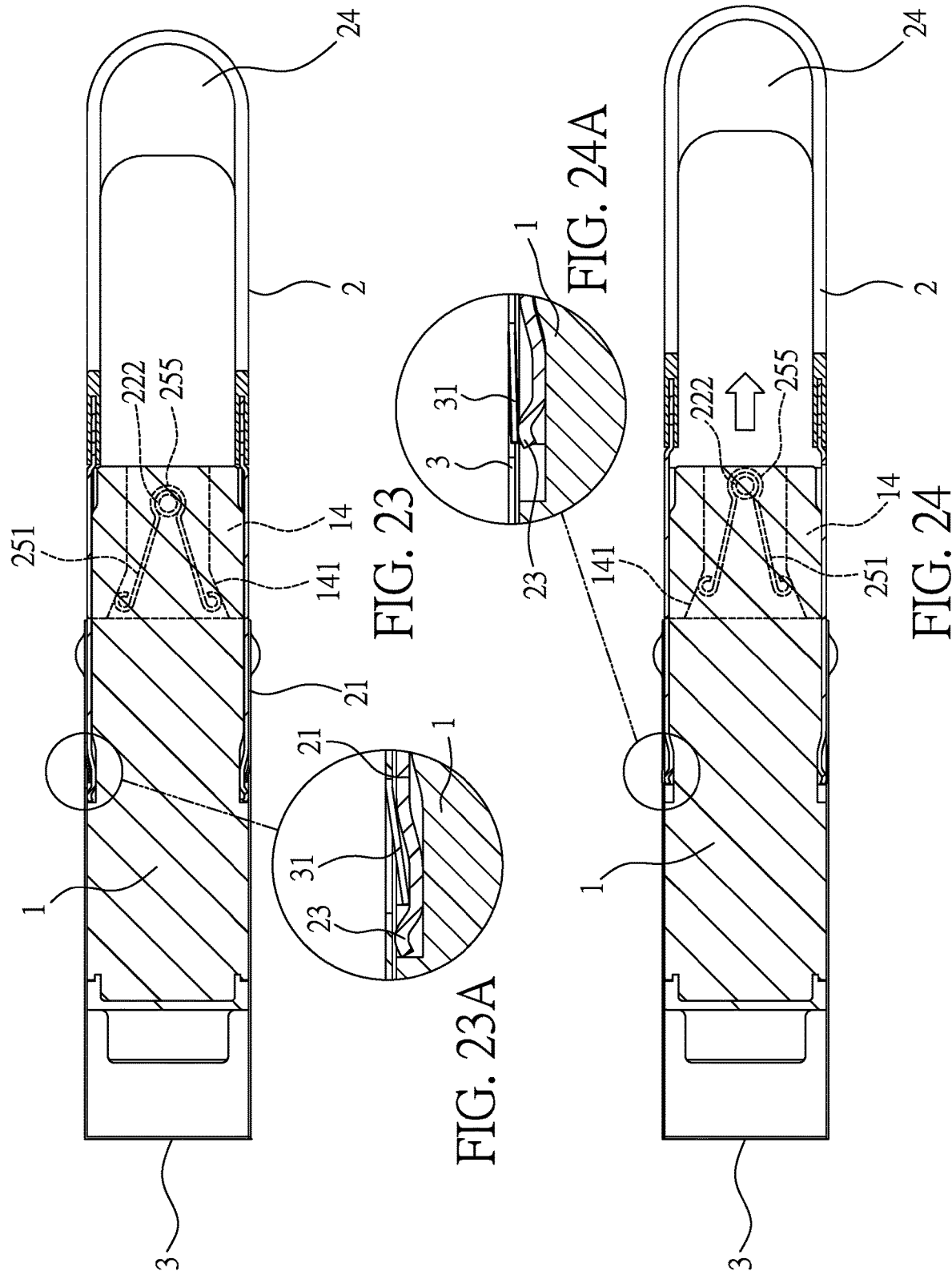

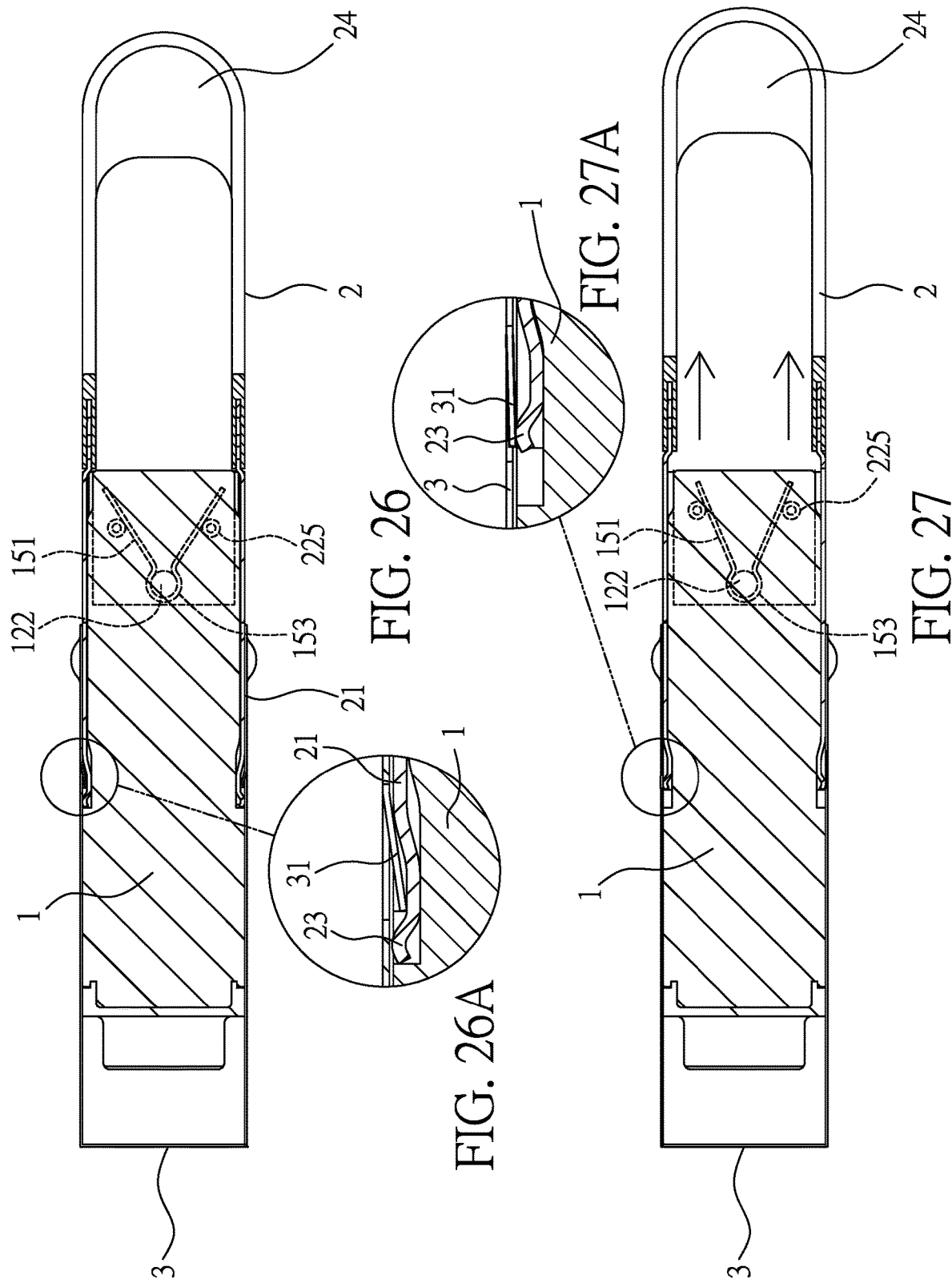

OPTICAL FIBER TRANSCEIVER

BACKGROUND OF THE INVENTION

1. Field of the Invention

The present invention relates to an optical fiber transceiver, especially to an optical fiber transceiver applied for optical fiber transmissions or signal transmissions.

2. Description of Related Art

The development of optical communication technology is to meet the rapid growth of network volume requirement, and the photoelectric communication technology has also been widely adopted for satisfying the higher demand of communication speed and quality. Because of the feature of being able to rapidly transmitting data in a massive manner, the optical communication industry adopting an optical fiber network for transmission has been playing one of the most important roles in the communication field, and optical fiber application products relative to the optical communication have also been more important.

At present, the photoelectric industry combines the electronics and the optics for forming an application field. Wherein, the most important component is the optical transceiver which includes an opto-electrical transmitter and an opto-electrical receiver or an opto-electrical transceiver integrating the above two. The function of the opto-electrical transmitter is to convert an electric signal into an optical signal so as to be transmitted, and the main function of the opto-electrical receiver is to convert the received optical signal into an electric signal.

The optical transceiver has been developed from a gigabit interface converter (GBIC), which was used in the early stage, to a mini gigabit interface converter (MINI GBIC) having a much smaller size; and at present, a small form-factor (SPF) pluggable interface and a small form factor (SFF) interface and QSFP+/QSFP DD/OSFP having hot pluggable function are developed for meeting the industrial requirements. However, the above-mentioned components are hard to be plugged or unplugged due to the sizes thereof, thus an optical transceiver having an ejecting mechanism is invented by the skilled people in the art.

U.S. Pat. No. 9,720,189B1 (equivalent to Taiwan Patent Registration NO.M521746) has disclosed an optical fiber connector, which comprises: a cartridge, having two opposite sidewalls and a wire terminal, wherein each sidewall has a runner and a containing slot formed on a side of the wire terminal; a latch, including a pull handle, a sliding member having two opposite extending arms, and a stop portion disposed at each extending arm, and the pull handle being capable of rotatably coupling the sliding member, each extending arm being slidably combined with the cartridge through each runner; and a pair of elastic members; wherein each extending arm has an opening allowing each elastic member to be received, and the stop portion is bent from a side of the opening and extended into the containing slot.

Because each elastic member is received in the containing slot through the opening, one end thereof is abutted against one end of each containing slot, and another end thereof is abutted against each stop portion. As such, if each elastic member is improperly positioned in an initial installation stage, a situation of each elastic member being jammed or released from the opening during an operating process may occur, so that the cartridge may be unnecessarily worn by a pair of the extending arms or a malfunction of unable to slide may even happen.

Therefore, how to provide a precise positioning function to the elastic members shall be seriously concerned by the skilled people in the art.

SUMMARY OF THE INVENTION

One primary objective of the present invention is to provide an optical fiber transceiver, in which an elastic member and an abutting unit can be stably and precisely positioned between a cartridge and a sliding member through an opposite arrangement and displacement of the elastic member and the abutting unit, so that situations of a pair of conventional spring being poorly positioned, and being jammed or released while being compressed or stretched can be prevented.

For achieving said objective, one technical solution provided by the present invention is to provide an optical fiber transceiver, which includes: a cartridge, formed with two opposite sidewalls and a front end thereof disposed with an insertion part, wherein each of the sidewalls is transversally formed with a runner; and a sliding member, formed with a pair of extending arms inserted in the pair of runners, wherein bottom ends defined at front portions of the pair of extending arms are connected via a connecting sheet, and rear ends thereof are protrudingly disposed with a pair of unlocking flanges; wherein, a top surface of the connecting sheet and a bottom surface of the insertion part are oppositely disposed with an elastic member and an abutting unit, two sides of the elastic member have a pair of elastic arms, and two sides of the abutting unit respectively have a guiding part symmetrically arranged and allowing each of the elastic arms to be in contact and displaced thereon, so that an energy storing status or an energy releasing status is formed during a process of the elastic member being displaced on the abutting unit.

According to one embodiment of the present invention, each of the extending arms is longitudinally and protrudingly formed with a stopping sheet, and the runner is concavely formed with a position limiting slot at a location corresponding to the stopping sheet and served to allow the stopping sheet to be inserted, so that an outward-displacing unlocking stroke or an inward-displacing locking stroke of the sliding member relative to the cartridge is defined.

According to one embodiment of the present invention, the insertion part is formed with at least one wire slot.

According to one embodiment of the present invention, the elastic member has a pair of L-shaped sheet members formed through a punching and bending means and arranged on the top surface of the connecting sheet, each of the L-shaped sheet members has an elastic arm extended in a direction towards an outer side of the connecting sheet, and a bending sheet connected to an inner end of the connecting sheet; the abutting unit is a trapezoid protrusion protruded from the bottom surface of the insertion part, two sides of the trapezoid protrusion are symmetrically and obliquely formed with a guiding part respectively for allowing each of the elastic arms to be in contact, and each of the guiding part is a guiding inclined surface.

According to one embodiment of the present invention, the elastic member has a U-shaped sheet member formed through a punching and bending means, the U-shaped sheet member has a pair of elastic arms extended in a direction towards an outer side of the connecting sheet, and a bending sheet connected to the pair of elastic arms, and a position limiting sheet is extended from the bending sheet in a direction towards the outer side of the connecting sheets; a bottom surface of the connecting sheet is formed with a position limiting slot at a location corresponding to the position limiting sheet; the position limiting sheet is received in the position limiting slot, thereby allowing the pair of elastic arms and the bending sheet to be protrudingly disposed on the top surface of the connecting sheet.

According to one embodiment of the present invention, a riveting, screwing or buckling means is adopted for enabling the position limiting sheet to be combined with and fastened in the position limiting slot.

According to one embodiment of the present invention, a front end and a rear end of the position limiting sheet are respectively formed with a first insertion sheet and a first insertion slot, and at least one buckle hook is disposed between the first insertion sheet and the first insertion slot; corresponding to locations of the first insertion sheet, the first insertion slot and the at least one buckle hook, a second insertion slot allowing the first insertion sheet to be inserted, a second insertion sheet for being received in the first insertion slot and at least one buckle slot allowing the at least one buckle hook to be buckled are respectively formed in the position limiting slot, so that the position limiting sheet is able to be tightly disposed in the position limiting slot.

According to one embodiment of the present invention, the elastic member is a W-shaped wire spring, two sides thereof are disposed with a pair of elastic arms extended in a direction towards an outer side of the connecting sheet, and a reverse-V-shaped wire spring for connecting the pair of elastic arms, and one connecting end of the V-shaped wire spring is formed with a sleeve ring; the top surface of the connecting sheet is protrudingly disposed with a sleeve tenon allowing the sleeve ring to be sleeved thereon, thereby allowing the elastic member to be combined with the connecting sheet; the abutting unit is a pair of wedge-shaped protrusions symmetrically arranged and protruded from the bottom surface of the insertion part, and inner sides of the pair of wedge-shaped protrusions are symmetrically and obliquely formed with a guiding part respectively for allowing each of the elastic arms to be in contact, and each of the guiding parts is a guiding inclined surface.

According to one embodiment of the present invention, the elastic member is a W-shaped wire spring, two sides thereof are disposed with a pair of elastic arms extended in a direction towards an inner side of the cartridge, and a reverse-V-shaped wire spring for connecting the pair of elastic arms, and one connecting end of the V-shaped wire spring is formed as a sleeve ring; the bottom surface of the insertion part is protrudingly disposed with a sleeve tenon allowing the sleeve ring to be sleeved thereon, thereby allowing the elastic member to be combined on the bottom surface of the insertion part; the abutting unit is a trapezoid protruding sheet integrally protruded from the connecting sheet and extended in a direction towards an inner side of the cartridge, and two sides defined on a top surface of the trapezoid protruding sheet are symmetrically and obliquely formed with a guiding part respectively for allowing each of the elastic arms to be in contact, and each of the guiding parts is a guiding inclined surface.

According to one embodiment of the present invention, the elastic member is a V-shaped wire spring, two sides thereof are disposed with a pair of elastic arms extended in a direction towards an inner side of the connecting sheet, and a sleeve ring formed through being connected to a connecting end of the pair of elastic arms; the top surface of the connecting sheet is protruded with a sleeve tenon allowing the sleeve ring to be sleeved thereon, thereby allowing the elastic member to be combined with the connecting sheet; the abutting unit is a pair of elongated protrusions symmetrically arranged and protruded from the bottom surface of the insertion part, inner ends of the pair of elongated protrusions are symmetrically and obliquely formed with a guiding part respectively for allowing each of the elastic arms to be in contact, and each of the guiding parts is a guiding inclined surface.

According to one embodiment of the present invention, the elastic member is a V-shaped wire spring, two sides thereof are disposed with a pair of elastic arms extended in a direction towards a front end of the cartridge, and a sleeve ring formed through being connected to a connecting end of the pair of elastic arms; the bottom surface of the insertion part is protruded with a sleeve tenon allowing the sleeve ring to be sleeved thereon, thereby allowing the elastic member to be combined on the bottom surface of the insertion part; the abutting unit is a guiding part protruded from a bottom surface of the connecting sheet for allowing each of the elastic arms to be in contact, and each of the guiding parts is a guiding column.

According to one embodiment of the present invention, front ends of the pair of extending arms are disposed with a pull handle.

According to one embodiment of the present invention, the pull handle is made of a polymer material, and a front portion of each of the extending arms is formed with at least one coupling hole, the pull handle is formed at the front end of each of the extending arms via an injection embedding means, and embedded in the at least one coupling hole.

According to one embodiment of the present invention, front ends of the pair of extending arms are further disposed with a pull ring, the pull ring has a pair of support arms, and a push sheet connected to the pair of support arms, the pair of support arms have a pair of shaft holes pivoted with a pair of pivotal shafts of the pair of sidewalls, and a pair of arc-shaped elongated slots sleeved on a pair of fastening shafts at the front ends of the pair of extending arms; with a distance difference defined between each of the arc-shaped elongated slots and a top distal end and a bottom distal end of the corresponding fastening shaft; when the push sheet of the pull ring is operated, the pair of fastening shafts are enabled to be rotated from the bottom distal end of the pair of arc-shaped elongated slots to the top distal end thereof, the sliding member is pulled for be displaced towards a direction opposite to a connector socket, and an elastic locking sheet is propped during a process of the unlocking flange at the distal end of each of the extending arms being displaced, thereby allowing the optical fiber transceiver to be removed from the connector socket.

BRIEF DESCRIPTION OF THE DRAWINGS

The present invention will be apparent to those skilled in the art by reading the following detailed description of a preferred embodiment thereof, with reference to the attached drawings, in which:

FIG. 5 is a cross sectional view illustrating the optical fiber transceiver of FIG. 1 and the connector socket being in a locking status according to the first embodiment of the present invention;

FIG. 5A is a partially enlarged cross sectional view of the circled position of FIG. 5;

FIG. 6 is a side view illustrating the optical fiber transceiver of FIG. 1 and the connector socket being in the locking status according to the first embodiment of the present invention;

FIG. 7 is a cross sectional view illustrating the optical fiber transceiver of FIG. 1 and the connector socket being in an unlocking status according to the first embodiment of the present invention;

FIG. 7A is a partially enlarged cross sectional view of the circled position of FIG. 7;

FIG. 8 is a side view illustrating the optical fiber transceiver of FIG. 1 and the connector socket being in the unlocking status according to the first embodiment of the present invention;

FIG. 14 is a cross sectional view illustrating the optical fiber transceiver of FIG. 11 and the connector socket being in a locking status according to the second embodiment of the present invention;

FIG. 14A is a partially enlarged cross sectional view of the circled position of FIG. 14;

FIG. 15 is a cross sectional view illustrating the optical fiber transceiver of FIG. 11 and the connector socket being in an unlocking status according to the second embodiment of the present invention;

FIG. 15A is a partially enlarged cross sectional view of the circled position of FIG. 15;

FIG. 17 is a cross sectional view illustrating the optical fiber transceiver of FIG. 16 and the connector socket being in a locking status according to the third embodiment of the present invention;

FIG. 17A is a partially enlarged cross sectional view of the circled position of FIG. 17;

FIG. 18 is a cross sectional view illustrating the optical fiber transceiver of FIG. 16 and the connector socket being in an unlocking status according to the third embodiment of the present invention;

FIG. 18A is a partially enlarged cross sectional view of the circled position of FIG. 18;

FIG. 20 is a cross sectional view illustrating the optical fiber transceiver of FIG. 19 and the connector socket being in a locking status according to the fourth embodiment of the present invention;

FIG. 20A is a partially enlarged cross sectional view of the circled position of FIG. 20;

FIG. 21 is a cross sectional view illustrating the optical fiber transceiver of FIG. 19 and the connector socket being in an unlocking status according to the fourth embodiment of the present invention;

FIG. 21A is a partially enlarged cross sectional view of the circled position of FIG. 21;

FIG. 23 is a cross sectional view illustrating the optical fiber transceiver of FIG. 22 and the connector socket being in a locking status according to the fifth embodiment of the present invention;

FIG. 23A is a partially enlarged cross sectional view of the circled position of FIG. 23;

FIG. 24 is a cross sectional view illustrating the optical fiber transceiver of FIG. 22 and the connector socket being in an unlocking status according to the fifth embodiment of the present invention;

FIG. 24A is a partially enlarged cross sectional view of the circled position of FIG. 24;

FIG. 26 is a cross sectional view illustrating the optical fiber transceiver of FIG. 25 and the connector socket being in a locking status according to the sixth embodiment of the present invention;

FIG. 26A is a partially enlarged cross sectional view of the circled position of FIG. 26;

FIG. 27 is a cross sectional view illustrating the optical fiber transceiver of FIG. 25 and the connector socket being in an unlocking status according to the sixth embodiment of the present invention;

FIG. 27A is a partially enlarged cross sectional view of the circled position of FIG. 27;

DETAILED DESCRIPTION OF THE PREFERRED EMBODIMENT

Figure 1:
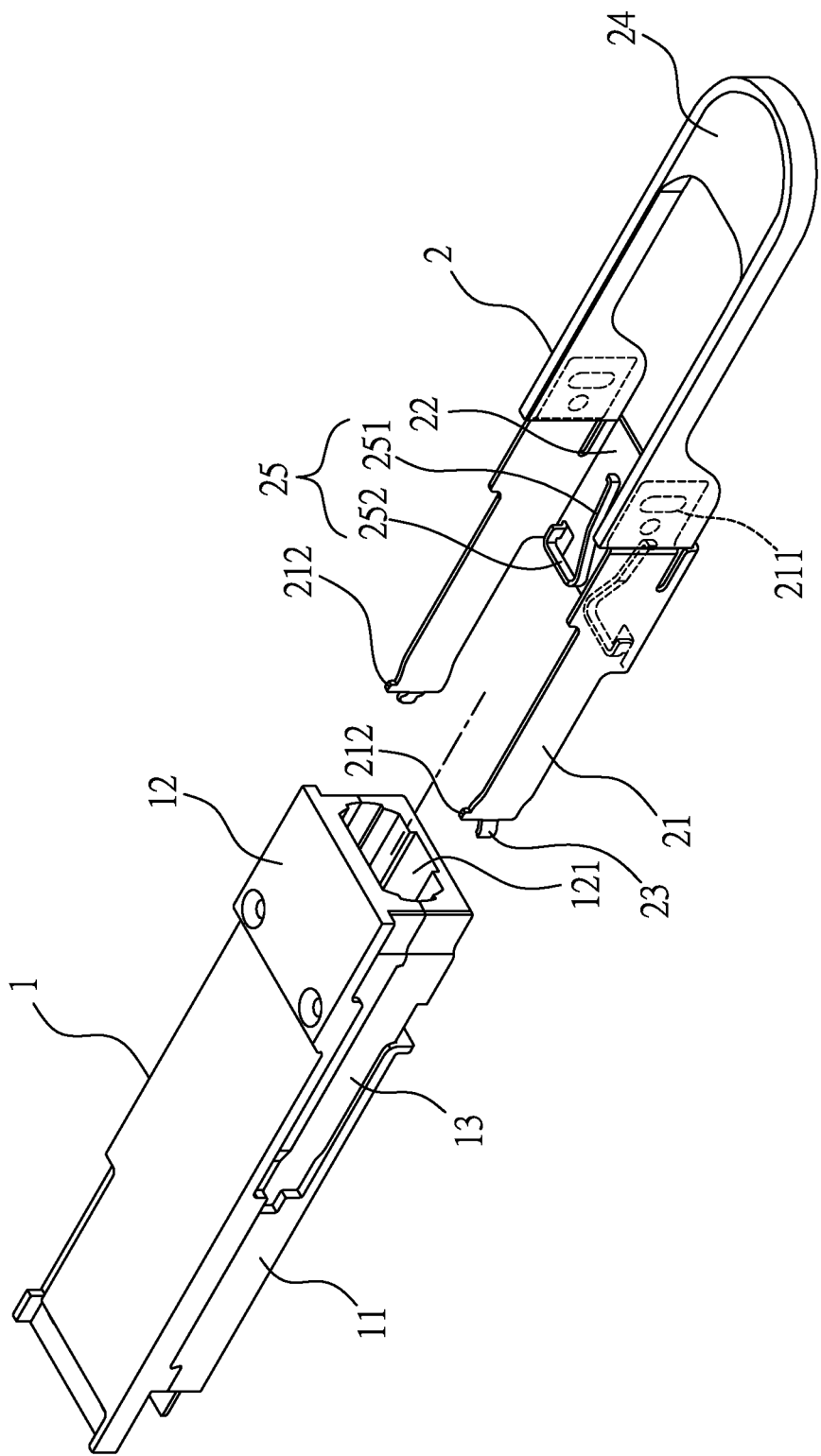
FIG. 1 is a perspective exploded view illustrating an optical fiber transceiver according to a first embodiment of the present invention.

Please refer to FIG. 1 and FIG. 8, an optical fiber transceiver including a cartridge 1 and a sliding member 2 is disclosed by the present invention.

The cartridge 1 is formed with two opposite sidewalls 11 and a front end thereof is disposed with an insertion part 12, wherein each sidewall 11 is transversally formed with a runner 13. The insertion part 12 is formed with at least one wire slot 121, thereby allowing an optical fiber cable (known as prior art therefore not shown in figures) to be inserted therein, and the optical fiber cable is able to be electrically coupled to a photoelectric component (known as prior art therefore not shown in figures) disposed in the cartridge 1. For example, the photoelectric component can be at least one light source, at least one light sensor, at least one lens and other optical instrument, at least one digital signal driver and at least one receiver circuit or a circuit board.

The sliding member 2 is formed with a pair of extending arms 21 inserted in the pair of runners 13, bottom ends defined at front portions of the pair of extending arms 21 are connected via a connecting sheet 22, and rear ends thereof are protrudingly disposed with a pair of unlocking flanges 23, and front ends of the pair of extending arms 21 are disposed with a pull handle 24, the pull handle 24 is made of a polymer material, for example rubber or silicon, and a front portion of each extending arm 21 is formed with at least one coupling hole 211, the pull handle 24 is formed at the front end of each extending arm 21 via an injection embedding means, and embedded in the at least one coupling hole 211, thereby enabling the pull handle 24 to be fastened respectively at the front end of each extending arm 21.

Each extending arm 21 is longitudinally and protrudingly formed with a stopping sheet 212, and the runner 13 is concavely formed with a position limiting slot 131 at a location corresponding to the stopping sheet 212 and served to allow the stopping sheet 212 to be inserted, so that an outward-displacing unlocking stroke or an inward-displacing locking stroke of the sliding member 2 relative to the cartridge 1 can be defined.

The optical fiber transceiver is characterized in that: a top surface of the connecting sheet 22 and a bottom surface of the insertion part 12 are oppositely disposed with an elastic member 25 and an abutting unit 14; two sides of the elastic member 25 have a pair of elastic arms 251, and two sides of the abutting unit 14 respectively has a guiding part 141, for example a guiding inclined surface or a guiding column, symmetrically arranged and allowing each elastic arm 251 to be in contact and displaced thereon, so that an energy storing status or an energy releasing status can be formed during a process of the elastic member 25 being displaced on the abutting unit 14.

Figure 2:
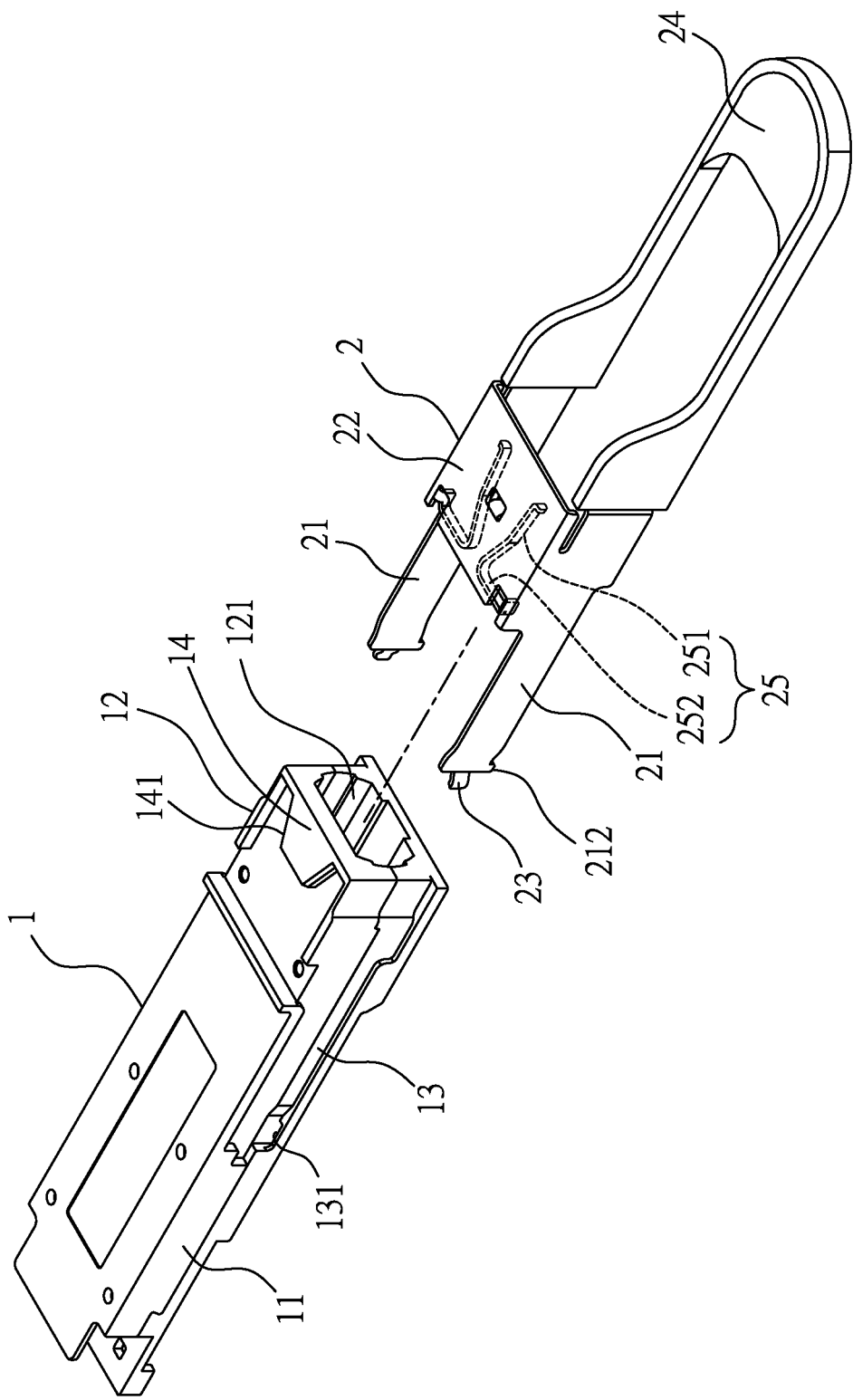
FIG. 2 is another perspective exploded view illustrating the optical fiber transceiver according to the first embodiment of the present invention.

As shown in FIG. 1 and FIG. 2, the elastic member 25 has a pair of L-shaped sheet members formed through a punching and bending means and arranged on the top surface of the connecting sheet 22, each L-shaped sheet member has the elastic arm 251 extended in a direction towards the outer side of the connecting sheet 22, and a bending sheet 252 connected to an inner end of the connecting sheet 22. In practice, the abutting unit 14 is a trapezoid protrusion protruded from the bottom surface of the insertion part 12, two sides of the trapezoid protrusion are symmetrically and obliquely formed with the guiding part 141, for example a guiding inclined surface, respectively for allowing each elastic arm 251 to be in contact.

Figure 3:
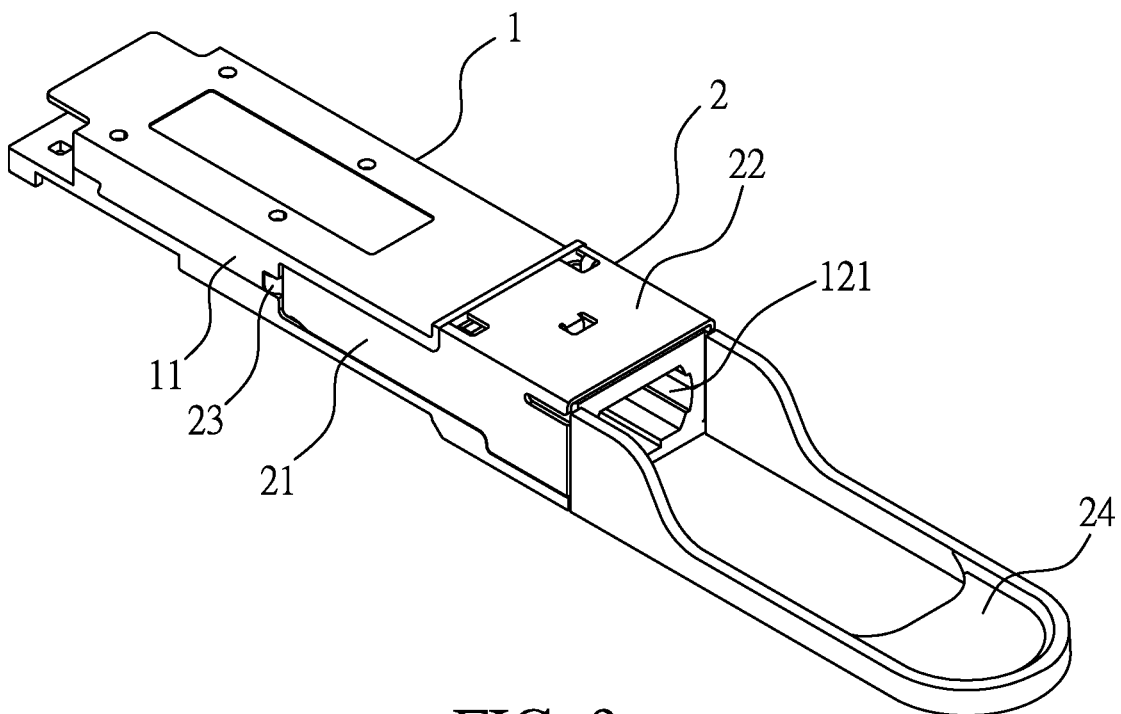
FIG. 3 is a perspective view illustrating the assembly of the optical fiber transceiver of FIG. 1 according to the first embodiment of the present invention.
Figure 4:
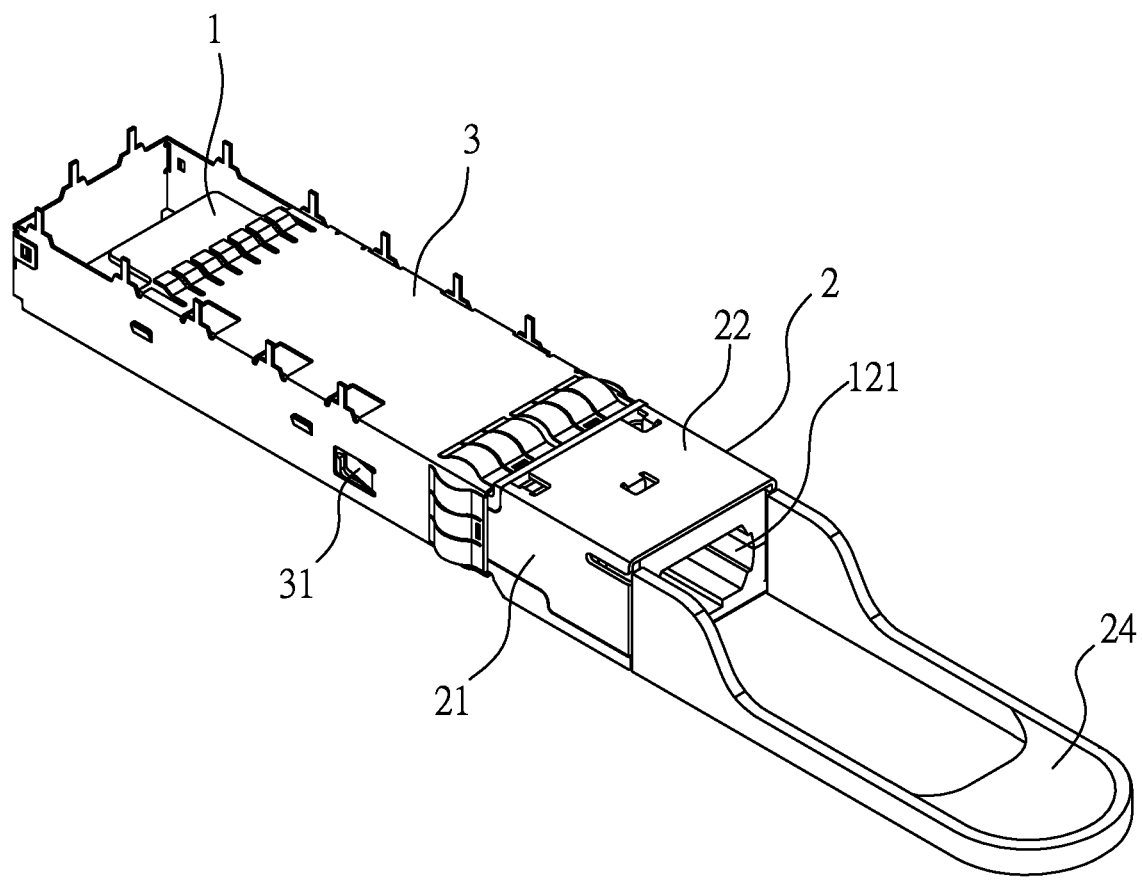
FIG. 4 is a perspective view illustrating the optical fiber transceiver of FIG. 1 being plugged in a connector socket according to the first embodiment of the present invention.

According to the first embodiment, after the components shown in FIG. 1 and FIG. 2 are assembled, the assembly of the optical fiber transceiver of the present invention is as shown FIG. 3, and the optical fiber transceiver is able to be latched and fastened in a connector socket 3 (as shown in FIG. 4), and the sliding member 2 can be utilized for allowing the cartridge 1 to be removed from the connector socket 3.

As shown in FIG. 1 and FIG. 2, in practice, the wire slot 121 is an insertion port, so that after an insertion head (not shown in figures) of an optical fiber cable is inserted, a light signal connection can be established. Or in another practice, the wire slot 121 is a penetrated hole, so that an optical fiber cable (not shown in figures) can pass the penetrated hole and coupled with a circuit board (not shown in figures) disposed in the cartridge 1, thereby establishing the above-mentioned light signal connection.

As shown in FIG. 4 to FIG. 6, when the optical fiber transceiver is plugged in the connector socket 3, the pair of unlocking flanges 3 at rear ends of the pair of extending arms 21 are buckled in a pair of elastic locking sheets 31 oppositely disposed at two sides of the connector socket 3, thereby forming a locking status (as shown in FIG. 5); and the stopping sheet 212 of each extending arm 21 is inserted at a rear end of the corresponding position limiting slot 131 of the runner 13 (as shown in FIG. 6). At this moment, the pair of elastic arms 251 of the elastic member 25 are in contact with two sides of the abutting unit 14 for forming an inclined expanding status, for example the pair of guiding parts 141 (such as guiding inclined surfaces) are in a flared status (as shown in FIG. 5).

As shown in FIG. 7 and FIG. 8, when it is necessary to replace or install an optical fiber transceiver with other specifications, a user only has to hold the pull handle 24 for driving the sliding member 2 to be displaced towards a direction opposite to the connector socket 3, the pair of elastic arms 251 of the elastic member 25 are outwardly displaced along the pair of guiding parts 141, thereby forming an outward energy storing status (as shown in FIG. 7). At this moment, the stopping sheet 212 of each extending arm 21 is inserted at a front end of the corresponding position limiting slot 131 of the runner 13, and a distance of the pair of elastic arms 251 being displaced along the pair of guiding parts 141 is defined, the elastic locking sheet 31 is propped during a process of the unlocking flange 23 at a distal end of each extending arm 21 being displaced, thereby allowing the optical fiber transceiver to be removed from the connector socket 3.

After the new optical fiber transceiver is disposed for replacement, the sliding member 2 is released, and the pair of elastic arms 251 are allowed to release energy and returned to initial locations along the pair of guiding parts 141, thereby enabling the sliding member 2 to be recovered to a locking position as shown in FIG. 4 and FIG. 5.

Please refer from FIG. 9 to FIG. 15, which disclose a second embodiment of the optical fiber transceiver, the same components shared by the second embodiment and the first embodiment are provided with the same codes; because there are many components shared by the second embodiment and the first embodiment, only differences between the two embodiments are disclosed as follows.

Figure 9:
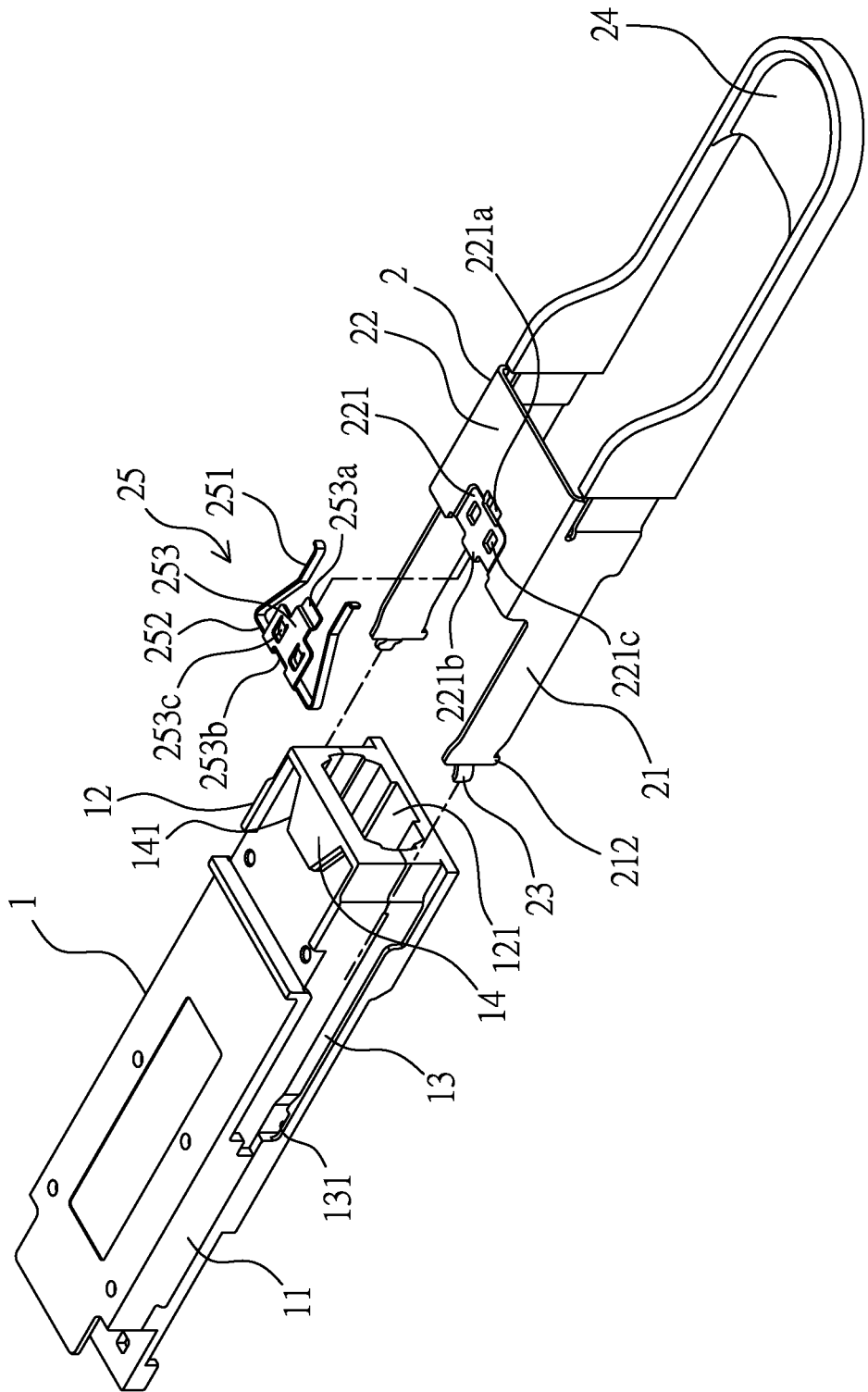
FIG. 9 is a perspective exploded view illustrating the optical fiber transceiver according to a second embodiment of the present invention.
Figure 10:
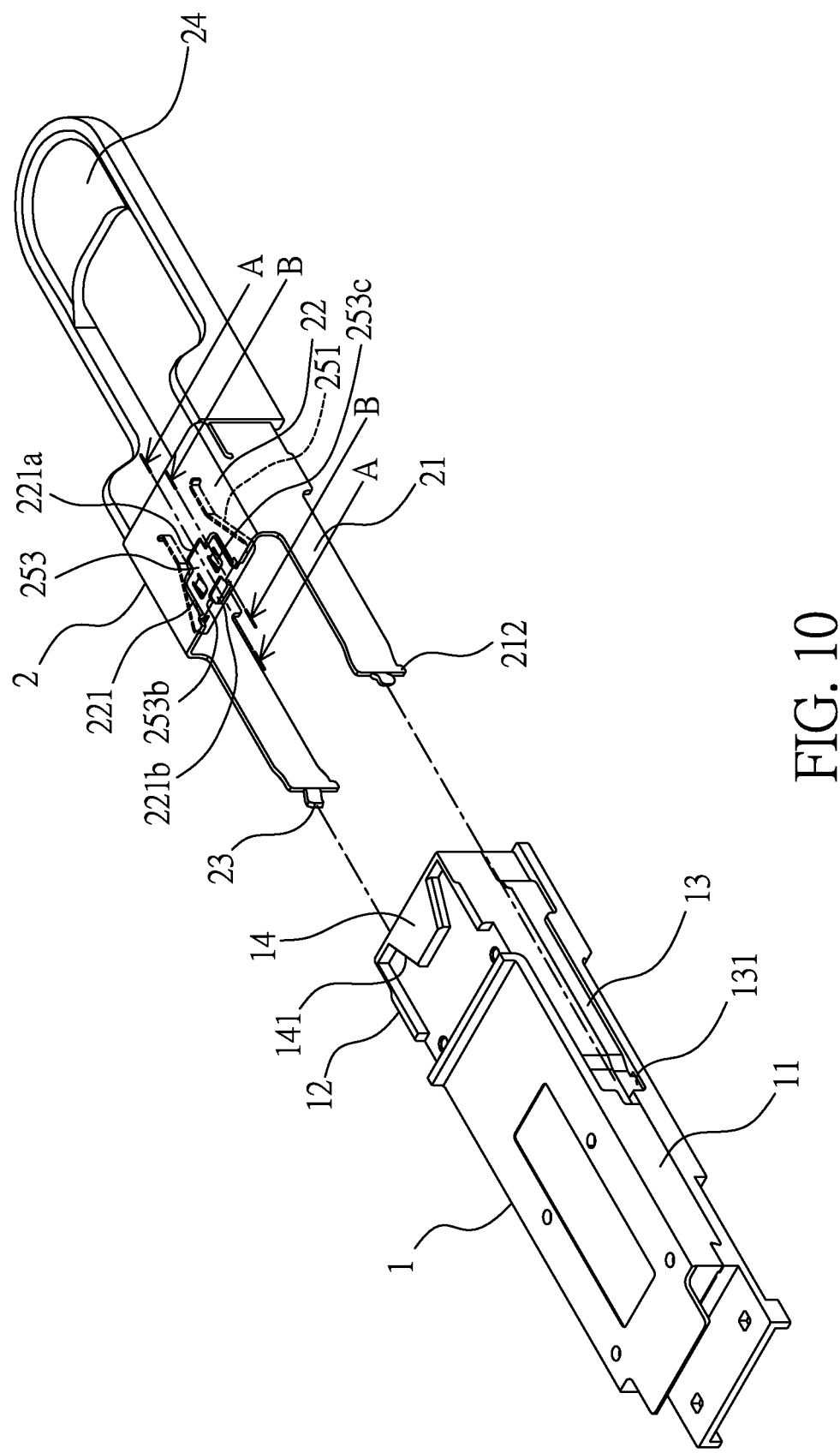
FIG. 10 is another perspective exploded view illustrating the optical fiber transceiver according to the second embodiment of the present invention.

The difference between the second embodiment and the first embodiment is that: the elastic member 25 is disposed on the connecting sheet 22 with a single piece manner, and the same energy storing and the same energy releasing effects provided by the first embodiment can also be achieved. As shown in FIG. 9 and FIG. 10, the arrangement of the abutting unit 14 and the pair of guiding parts 141 is the same as the first embodiment, therefore no further illustration is provided.

The elastic member 25 has a U-shaped sheet member formed through a punching and bending means, the U-shaped sheet member has the pair of elastic arms 251 extended in a direction towards the outer side of the connecting sheet 22, and the bending sheet 252 connected to the pair of elastic arms 251, and a position limiting sheet 253 is extended from the bending sheet 252 in a direction towards the outer side of the connecting sheets 22; the bottom surface of the connecting sheet 22 is formed with a position limiting slot 221 at a location corresponding to the position limiting sheet 253. The position limiting sheet 253 is received in the position limiting slot 221, thereby allowing the pair of elastic arms 251 and the bending sheet 252 to be protrudingly disposed on the top surface of the connecting sheet 22.

A riveting, screwing or buckling means can be adopted for enabling the position limiting sheet 253 to be combined with and fastened in the position limiting slot 221. As shown from FIG. 9 to FIG. 13, according to this embodiment, the buckling means for enabling the position limiting sheet 253 to be buckled in the position limiting slot 221 is adopted as an example, a front end and a rear end of the position limiting sheet 253 are respectively formed with a first insertion sheet 253a and a first insertion slot 253b, and at least one buckle hook 253c disposed between the first insertion sheet 253a and the first insertion slot 253b. Corresponding to locations of the first insertion sheet 253a, the first insertion slot 253b and the at least one buckle hook 253c, a second insertion slot 221a allowing the first insertion sheet 253a to be inserted, a second insertion sheet 221b for being received in the first insertion slot 253b and at least one buckle slot 221c allowing the at least one buckle hook 253c to be buckled are respectively formed in the position limiting slot 221, so that the position limiting sheet 253 can be tightly disposed in the position limiting slot 221, and a situation of separating can be avoided.

Figure 11:
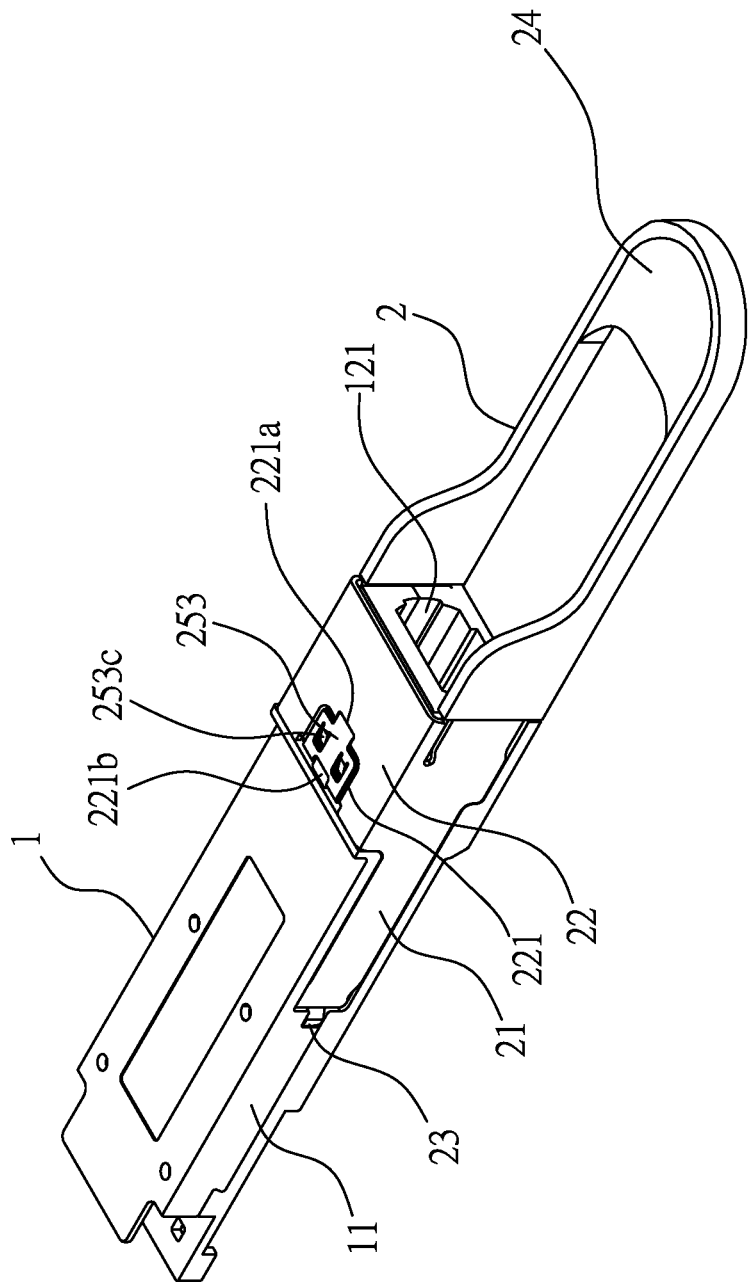
FIG. 11 is a perspective view illustrating the assembly of the optical fiber transceiver of FIG. 9 according to the second embodiment of the present invention.
Figure 12:
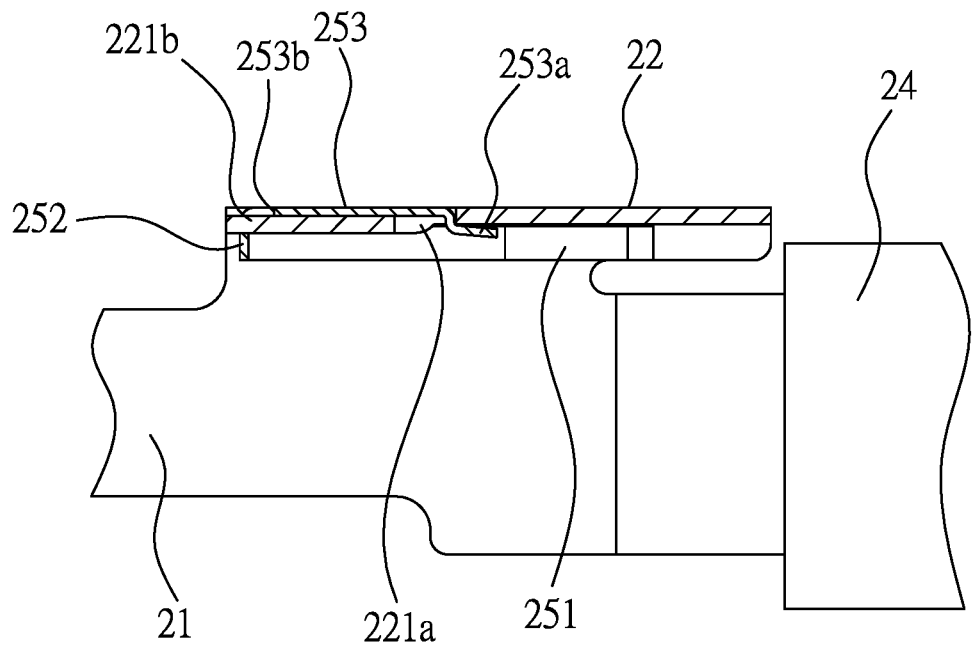
FIG. 12 is a cross sectional view of FIG. 11 taken along an A-A line.
Figure 13:
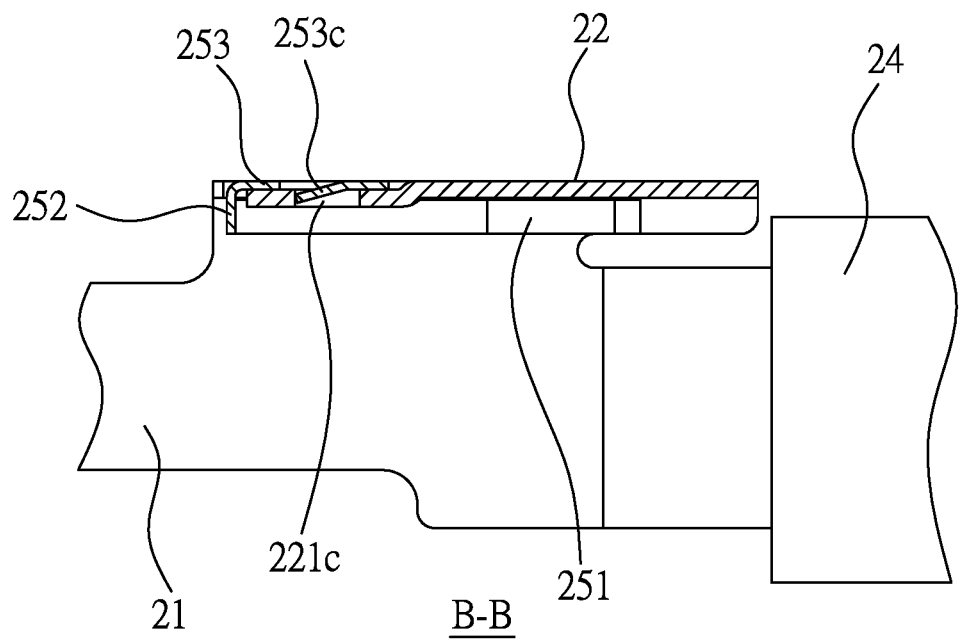
FIG. 13 is a cross sectional view of FIG. 9 taken along a B-B line.

According to the second embodiment, after the components shown in FIG. 9 and FIG. 10 are assembled, the assembly of the optical fiber transceiver of the present invention is as shown FIG. 11, and the optical fiber transceiver is able to be latched and fastened in the connector socket 3 (as shown in FIG. 4), and the sliding member 2 can be utilized for allowing the cartridge 1 to be removed from the connector socket 3.

As shown in FIG. 14, when the optical fiber transceiver is plugged in the connector socket 3, the pair of unlocking flanges 3 at the distal ends of the pair of extending arms 21 are buckled in the pair of elastic locking sheets 31 oppositely disposed at two sides of the connector socket 3, thereby forming a locking status; and the stopping sheet 212 of each extending arm 21 is inserted in the rear end of the corresponding position limiting slot 131 of the runner 13 (as shown in FIG. 6). At this moment, the pair of elastic arms 251 of the elastic member 25 are in contact with two sides of the abutting unit 14 for forming the inclined expanding status, for example the pair of guiding parts 141 are (such as guiding inclined surfaces) in a flared status.

As shown in FIG. 15, when it is necessary to replace or install an optical fiber transceiver with other specifications, the user only has to hold the pull handle 24 for driving the sliding member 2 to be displaced towards a direction opposite to the connector socket 3, the pair of elastic arms 251 of the elastic member 25 are displaced along the pair of guiding parts 141, thereby forming the outward energy storing status. At this moment, the stopping sheet 212 of each extending arm 21 is inserted at the front end of the corresponding position limiting slot 131 of the runner 13 (as shown in FIG. 8), and a distance of the pair of elastic arms 251 being displaced along the pair of guiding parts 141 is defined, the elastic locking sheet 31 is propped during a process of the unlocking flange 23 at the distal end of each extending arm 21 being displaced, thereby allowing the optical fiber transceiver to be removed from the connector socket 3.

After the new optical fiber transceiver is disposed for replacement, the sliding member 2 is released, and the pair of elastic arms 251 are allowed to release energy and returned to the initial locations along the pair of guiding parts 141, thereby enabling the sliding member 2 to be recovered to a locking position as shown in FIG. 14.

Figure 16:
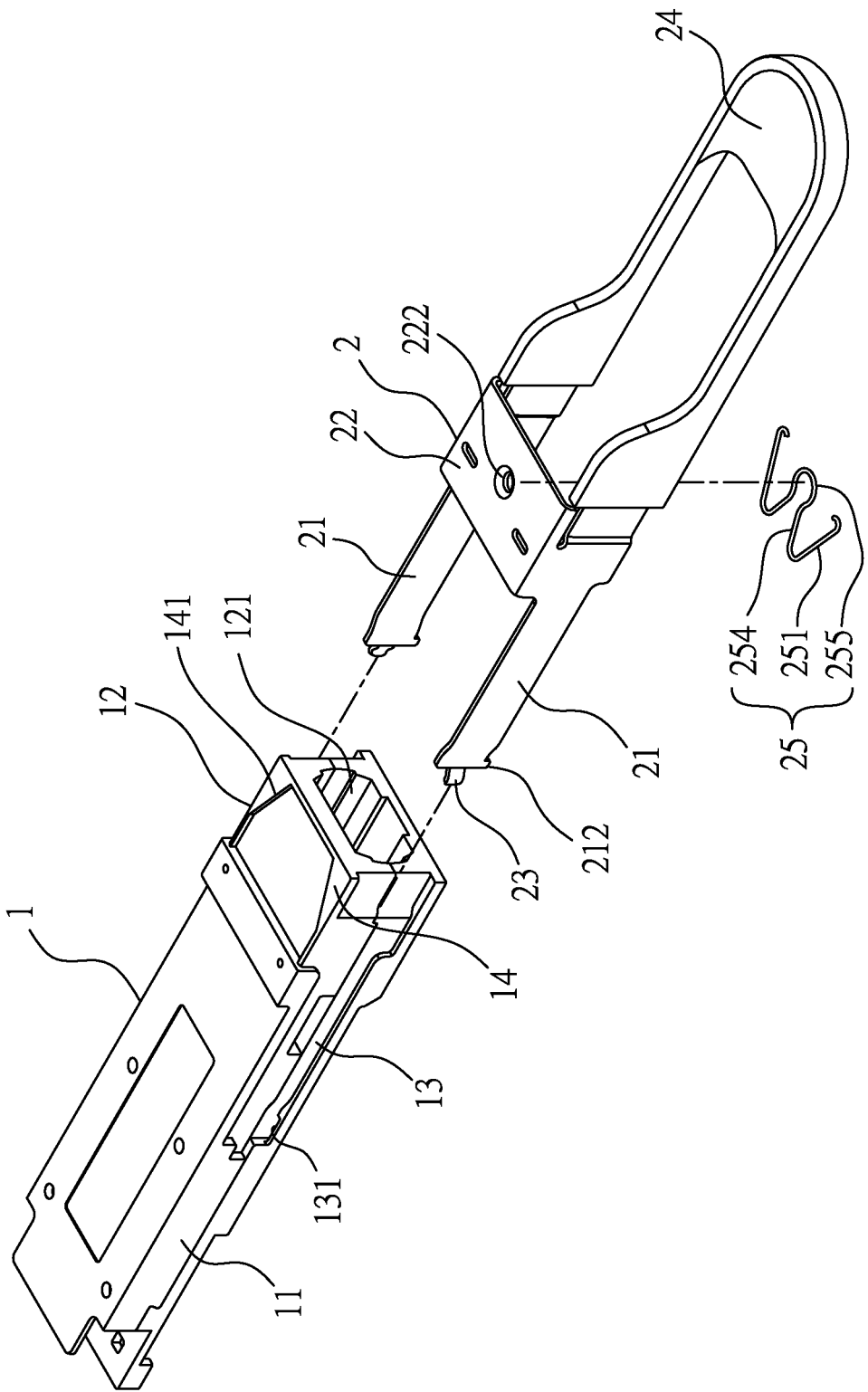
FIG. 16 is a perspective exploded view illustrating the optical fiber transceiver according to a third embodiment of the present invention.

Please refer from FIG. 16 to FIG. 18, which disclose a third embodiment of the optical fiber transceiver, the same components shared by the third embodiment and the first embodiment are provided with the same codes; because there are many components shared by the third embodiment and the first embodiment, only differences between the two embodiments are disclosed as follows.

The difference between the third embodiment and the first embodiment is that: the elastic member 25 is a W-shaped wire spring, two sides thereof are disposed with the pair of elastic arms 251 extended in a direction towards the outer side of the connecting sheet 22, and a reverse-V-shaped wire spring 254 is provided for connecting the pair of elastic arms 251, and one connecting end of the V-shaped wire spring 254 is formed with a sleeve ring 255; the top surface of the connecting sheet 22 is protrudingly disposed with a sleeve tenon 222 allowing the sleeve ring 255 to be sleeved thereon, thereby allowing the elastic member 25 to be combined with the connecting sheet 22. In practice, the abutting unit 14 is a pair of wedge-shaped protrusions symmetrically arranged and protruded from the bottom surface of the insertion part 12, and inner sides of the pair of wedge-shaped protrusions are symmetrically and obliquely formed with the guiding part 141, for example a guiding inclined surface, respectively for allowing each elastic arm 251 to be in contact.

As shown in FIG. 17, when the optical fiber transceiver is plugged in the connector socket 3, the pair of unlocking flanges 3 at the distal ends of the pair of extending arms 21 are buckled in the pair of elastic locking sheets 31 oppositely disposed at two sides of the connector socket 3, thereby forming a locking status; and the stopping sheet 212 of each extending arm 21 is inserted in the rear end of the corresponding position limiting slot 131 of the runner 13 (as shown in FIG. 6). At this moment, the pair of elastic arms 251 of the elastic member 25 are in contact with the pair of guiding parts 141, in an inclined retracting status, of the abutting unit 14.

As shown in FIG. 18, when it is necessary to replace or install an optical fiber transceiver with other specifications, the user only has to hold the pull handle 24 for driving the sliding member 2 to be displaced towards a direction opposite to the connector socket 3, the pair of elastic arms 251 of the elastic member 25 are displaced along the pair of guiding parts 141, thereby forming the inward energy storing status. At this moment, the stopping sheet 212 of each extending arm 21 is inserted at the front end of the corresponding position limiting slot 131 of the runner 13 (as shown in FIG. 8), and a distance of the pair of elastic arms 251 being displaced along the pair of guiding parts 141 is defined, the elastic locking sheet 31 is propped during a process of the unlocking flange 23 at the distal end of each extending arm 21 being displaced, thereby allowing the optical fiber transceiver to be removed from the connector socket 3.

After the new optical fiber transceiver is disposed for replacement, the sliding member 2 is released, and the pair of elastic arms 251 are allowed to release energy and returned to the initial locations along the pair of guiding parts 141, thereby enabling the sliding member 2 to be recovered to a locking position as shown in FIG. 17.

Figure 19:
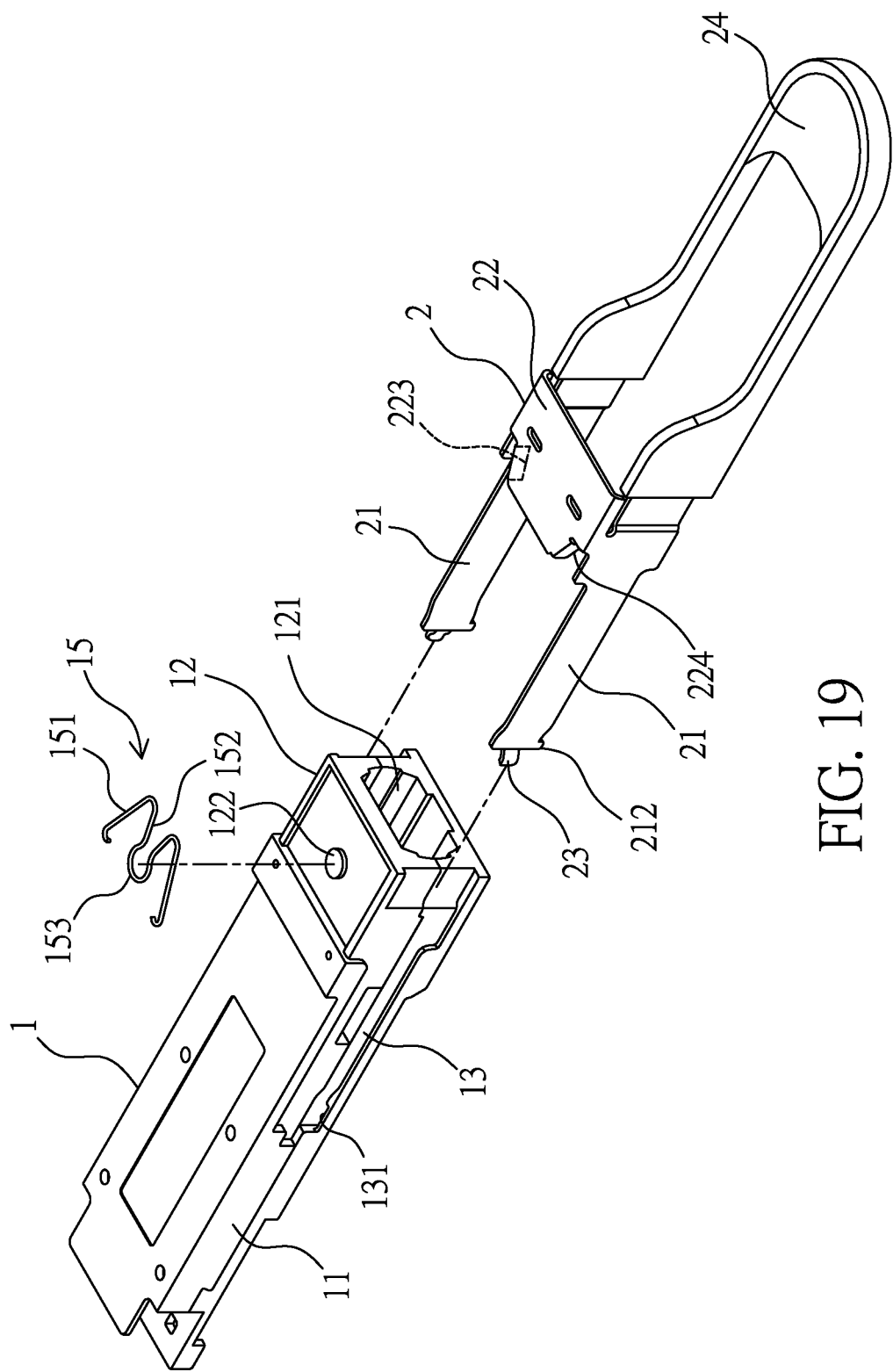
FIG. 19 is a perspective exploded view illustrating the optical fiber transceiver according to a fourth embodiment of the present invention.

Please refer from FIG. 19 to FIG. 21, which disclose a fourth embodiment of the optical fiber transceiver, the same components shared by the fourth embodiment and the third embodiment are provided with the same codes; because there are many components shared by the fourth embodiment and the third embodiment, only differences between the two embodiments are disclosed as follows.

The difference between the third embodiment and the first embodiment is that: the elastic member 25 is disposed on the bottom surface of the insertion part 12, thus the code for addressing the elastic member is recoded as 15 hereinafter, the structure of the elastic member 15 is the same as the third embodiment, in other words the elastic member 15 is a W-shaped wire spring, two sides thereof are disposed with a pair of elastic arms 151 extended in a direction towards the inner side of the cartridge 1, and a reverse-V-shaped wire spring 152 provided for connecting the pair of elastic arms 151, and one connecting end of the V-shaped wire spring 152 is formed as a sleeve ring 153; the bottom surface of the insertion part 12 is protrudingly disposed with the sleeve tenon 122 allowing the sleeve ring 153 to be sleeved thereon, thereby allowing the elastic member 15 to be combined on the bottom surface of the insertion part 12. In practice, the abutting unit 14 is a trapezoid protruding sheet 223 integrally protruded from the connecting sheet 22 and extended in a direction towards the inner side of the cartridge 1, and two sides defined on the top surface of the trapezoid protruding sheet 223 are symmetrically and obliquely formed with a guiding part 224, for example a guiding inclined surface, respectively for allowing each elastic arm 151 to be in contact.

As shown in FIG. 20, when the optical fiber transceiver is plugged in the connector socket 3, the pair of unlocking flanges 3 at the distal ends of the pair of extending arms 21 are buckled in the pair of elastic locking sheets 31 oppositely disposed at two sides of the connector socket 3, thereby forming a locking status; and the stopping sheet 212 of each extending arm 21 is inserted in the rear end of the corresponding position limiting slot 131 of the runner 13 (as shown in FIG. 6). At this moment, the pair of elastic arms 151 of the elastic member 15 are in contact with the pair of guiding parts 224 which are in an inclined retracting status.

As shown in FIG. 21, when it is necessary to replace or install an optical fiber transceiver with other specifications, the user only has to hold the pull handle 24 for driving the sliding member 2 to be displaced towards a direction opposite to the connector socket 3, the pair of elastic arms 151 of the elastic member 15 are displaced along the pair of guiding parts 224, thereby forming an inward energy storing status. At this moment, the stopping sheet 212 of each extending arm 21 is inserted at the front end of the corresponding position limiting slot 131 of the runner 13 (as shown in FIG. 8), and a distance of the pair of elastic arms 151 being displaced along the pair of guiding parts 224 is defined, the elastic locking sheet 31 is propped during a process of the unlocking flange 23 at the distal end of each extending arm 21 being displaced, thereby allowing the optical fiber transceiver to be removed from the connector socket 3.

After the new optical fiber transceiver is disposed for replacement, the sliding member 2 is released, the pair of elastic arms 151 are allowed to release energy and returned to initial locations along the pair of guiding parts 224, thereby enabling the sliding member 2 to be recovered to a locking position as shown in FIG. 20.

Figure 22:
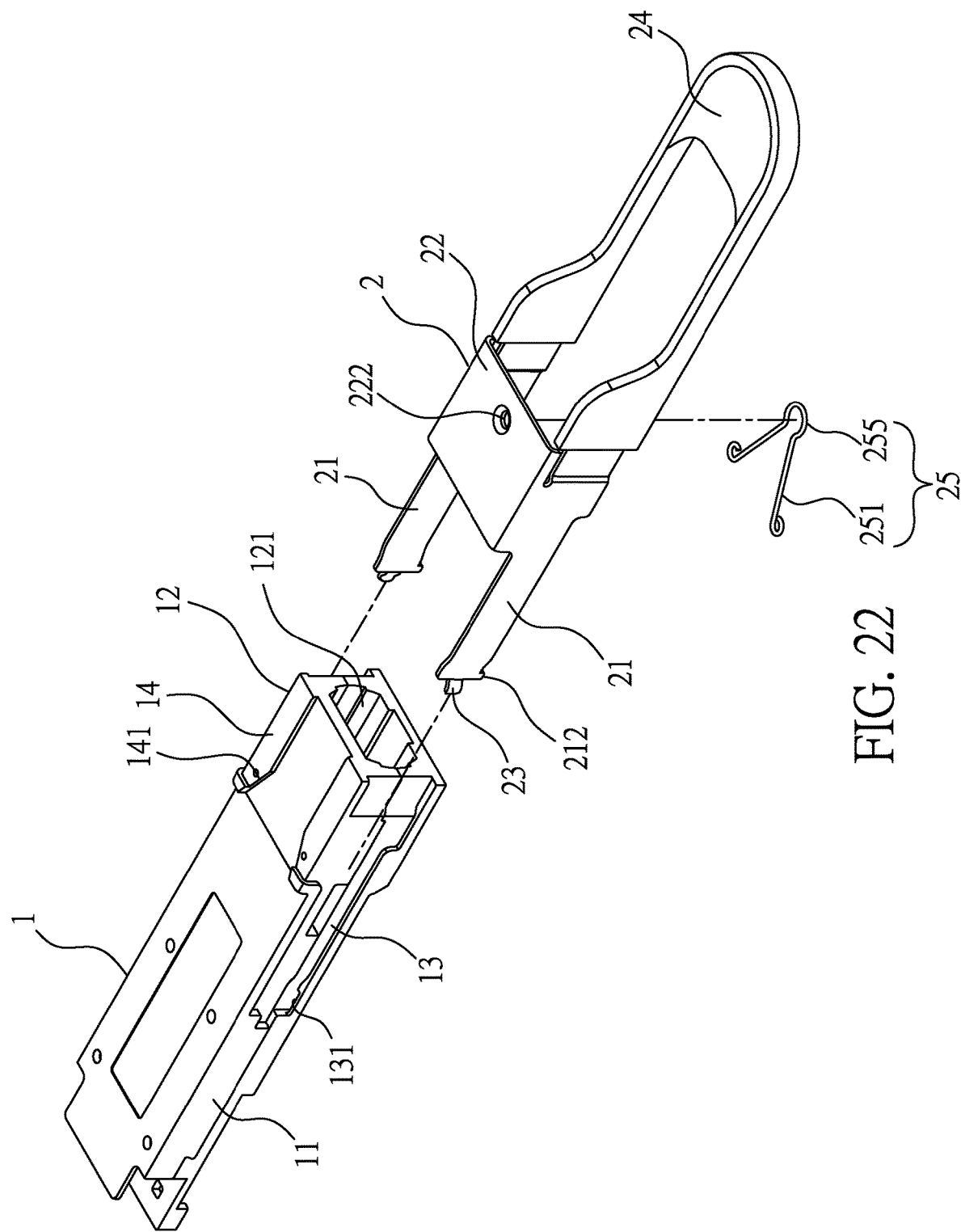
FIG. 22 is a perspective exploded view illustrating the optical fiber transceiver according to a fifth embodiment of the present invention.

Please refer from FIG. 22 to FIG. 24, which disclose a fifth embodiment of the optical fiber transceiver, the same components shared by the fifth embodiment and the first embodiment are provided with the same codes; because there are many components shared by the fifth embodiment and the first embodiment, only differences between the two embodiments are disclosed as follows.

The difference between the fifth embodiment and the first embodiment is that: the elastic member 25 is a V-shaped wire spring, two sides thereof are disposed with the pair of elastic arms 251 extended in a direction towards the inner side of the connecting sheet 22, and the sleeve ring 255 formed through being connected to a connecting end of the pair of elastic arms 251; the top surface of the connecting sheet 22 is protruded with the sleeve tenon 222 allowing the sleeve ring 255 to be sleeved thereon, thereby allowing the elastic member 25 to be combined with the connecting sheet 22. In practice, the abutting unit 14 is a pair of elongated protrusions symmetrically arranged and protruded from the bottom surface of the insertion part 12, inner ends of the pair of elongated protrusions are symmetrically and obliquely formed with the guiding part 141, for example a guiding inclined surface, respectively for allowing each elastic arm 251 to be in contact.

As shown in FIG. 23, when the optical fiber transceiver is plugged in the connector socket 3, the pair of unlocking flanges 3 at the distal ends of the pair of extending arms 21 are buckled in the pair of elastic locking sheets 31 oppositely disposed at two sides of the connector socket 3, thereby forming a locking status; and the stopping sheet 212 of each extending arm 21 is inserted in the rear end of the corresponding position limiting slot 131 of the runner 13 (as shown in FIG. 6). At this moment, the pair of elastic arms 251 of the elastic member 25 are in contact with the pair of guiding parts 141, in an inclined retracting status, of the abutting unit 14.

As shown in FIG. 24, when it is necessary to replace or install an optical fiber transceiver with other specifications, the user only has to hold the pull handle 24 for driving the sliding member 2 to be displaced towards a direction opposite to the connector socket 3, the pair of elastic arms 251 of the elastic member 25 are displaced along the pair of guiding parts 141, thereby forming an inward energy storing status. At this moment, the stopping sheet 212 of each extending arm 21 is inserted at the front end of the corresponding position limiting slot 131 of the runner 13 (as shown in FIG. 8), and a distance of the pair of elastic arms 251 being displaced along the pair of guiding parts 141 is defined, the elastic locking sheet 31 is propped during a process of the unlocking flange 23 at the distal end of each extending arm 21 being displaced, thereby allowing the optical fiber transceiver to be removed from the connector socket 3.

After the new optical fiber transceiver is disposed for replacement, the sliding member 2 is released, the pair of elastic arms 251 are allowed to release energy and returned to the initial locations along the pair of guiding parts 141, thereby enabling the sliding member 2 to be recovered to a locking position as shown in FIG. 23.

Figure 25:
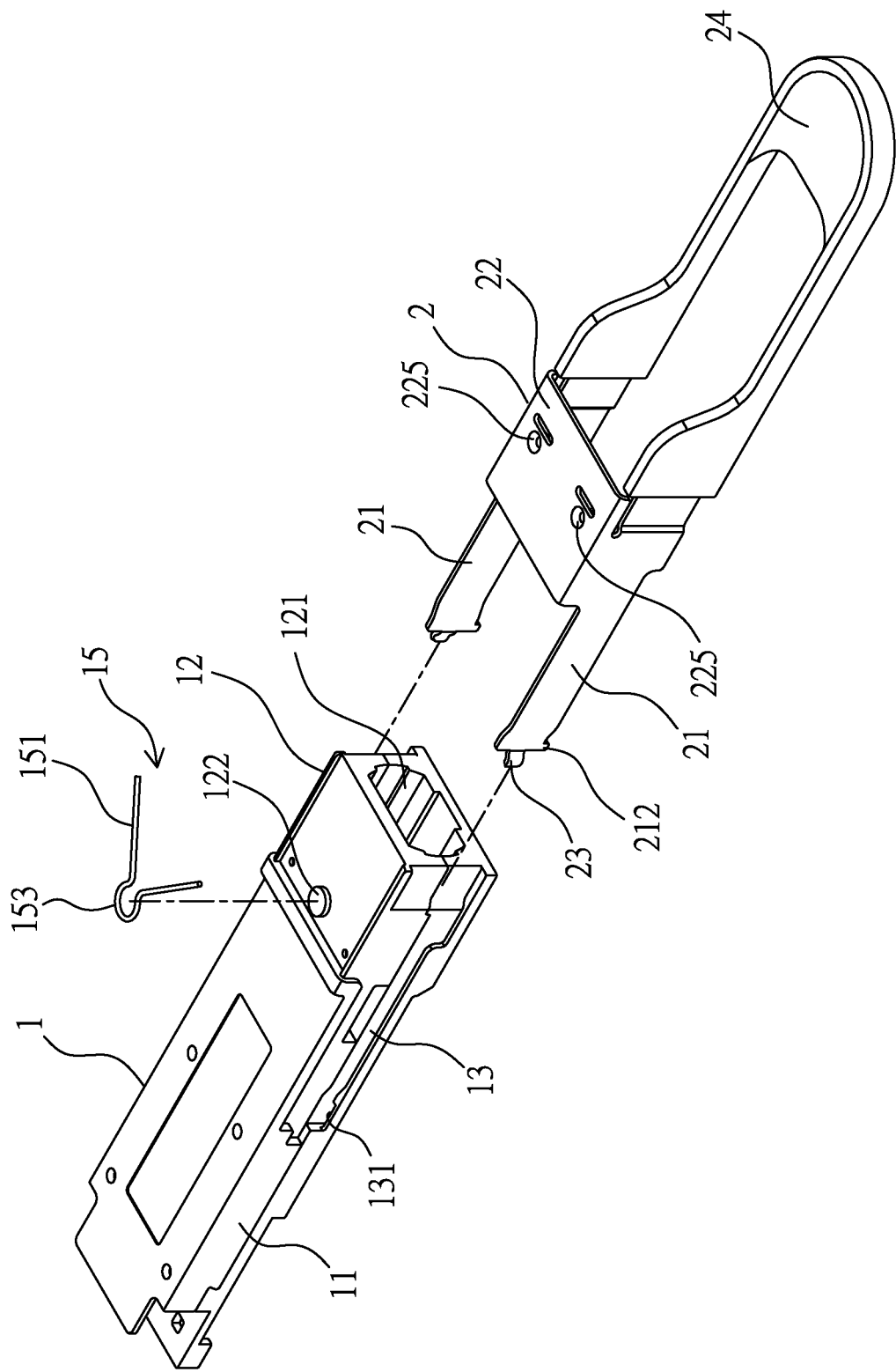
FIG. 25 is a perspective exploded view illustrating the optical fiber transceiver according to a sixth embodiment of the present invention.
Figure 28:
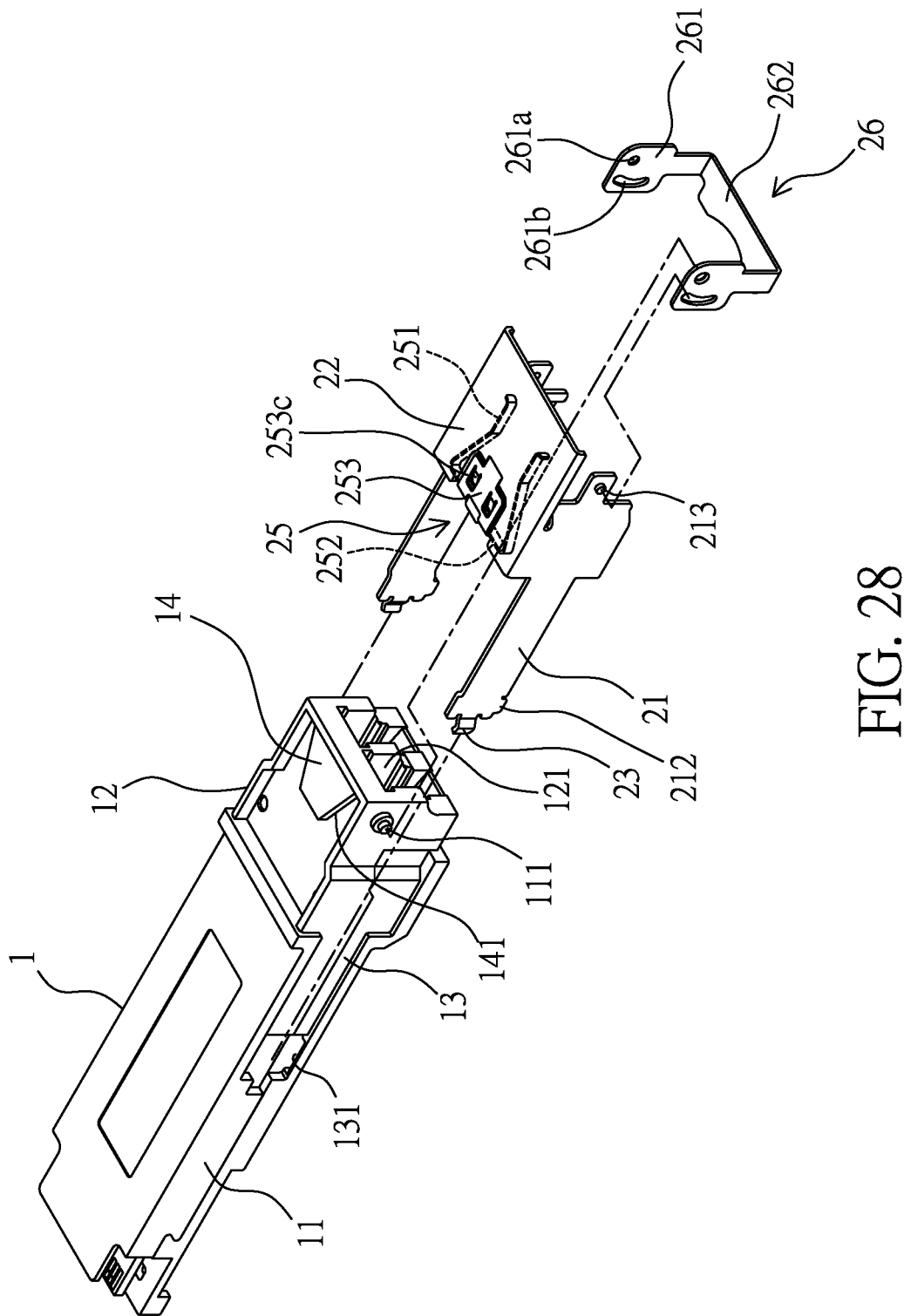
FIG. 28 is a perspective exploded view illustrating the optical fiber transceiver according to a seventh embodiment of the present invention.

Please refer from FIG. 25 to FIG. 27, which disclose a sixth embodiment of the optical fiber transceiver, the same components shared by the sixth embodiment and the fifth embodiment are provided with the same codes; because there are many components shared by the sixth embodiment and the fifth embodiment, only differences between the two embodiments are disclosed as follows.

The difference between the sixth embodiment and the fifth embodiment is that: the elastic member 25 is disposed on the bottom surface of the insertion part 12, thus the code for addressing the elastic member is recoded as 15 hereinafter, the structure of the elastic member 15 is the same as the fifth embodiment, in other words the elastic member 15 is a V-shaped wire spring, two sides thereof are disposed with the pair of elastic arms 151 extended in a direction towards the inner sides of the cartridge 1, and the sleeve ring 153 formed through being connected to a connecting end of the pair of elastic arms 151; the bottom surface of the insertion part 12 is protruded with the sleeve tenon 122 allowing the sleeve ring 153 to be sleeved thereon, thereby allowing the elastic member 15 to be combined with the bottom surface of the insertion part 12. In practice, the abutting unit is a guiding part 225, for example a guiding column, protruded from the top surface of the connecting sheet 22 and allowing the pair of elastic arms 151 to be in contact respectively.

As shown in FIG. 26, when the optical fiber transceiver is plugged in the connector socket 3, the pair of unlocking flanges 3 at the distal ends of the pair of extending arms 21 are buckled in the pair of elastic locking sheets 31 oppositely disposed at two sides of the connector socket 3, thereby forming a locking status; and the stopping sheet 212 of each extending arm 21 is inserted in the rear end of the corresponding position limiting slot 131 of the runner 13 (as shown in FIG. 6). At this moment, the pair of elastic arms 151 of the elastic member 15 are in contact with the pair of guiding parts 225 of the connecting sheet 22.

As shown in FIG. 27, when it is necessary to replace or install an optical fiber transceiver with other specifications, the user only has to hold the pull handle 24 for driving the sliding member 2 to be displaced towards a direction opposite to the connector socket 3, the pair of elastic arms 151 of the elastic member 15 are displaced along the pair of guiding parts 225, thereby forming an inward energy storing status. At this moment, the stopping sheet 212 of each extending arm 21 is inserted at the front end of the corresponding position limiting slot 131 of the runner 13 (as shown in FIG. 8), and a distance of the pair of elastic arms 151 being displaced along the pair of guiding parts 225 is defined, the elastic locking sheet 31 is propped during a process of the unlocking flange 23 at the distal end of each extending arm 21 being displaced, thereby allowing the optical fiber transceiver to be removed from the connector socket 3.

After the new optical fiber transceiver is disposed for replacement, the sliding member 2 is released, and the pair of elastic arms 251 are allowed to release energy and returned to the initial locations along the pair of guiding parts 141, thereby enabling the sliding member 2 to be recovered to a locking position as shown in FIG. 20.

Please refer from FIG. 28 to FIG. 31, which disclose a seventh embodiment of the optical fiber transceiver, the same components shared by the seventh embodiment and the above-mentioned embodiments are provided with the same codes; because there are many components shared by the seventh embodiment and the above-mentioned embodiments, only differences between the seventh embodiment and the above-mentioned embodiments are disclosed as follows.

Figure 29:
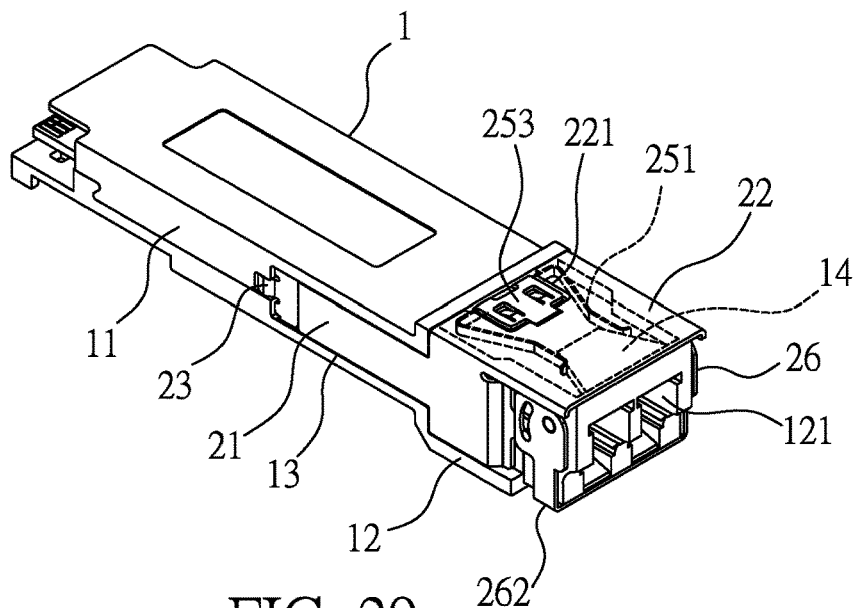
FIG. 29 is a perspective view illustrating the assembly of the optical fiber transceiver according to the seventh embodiment of the present invention.
Figure 30:
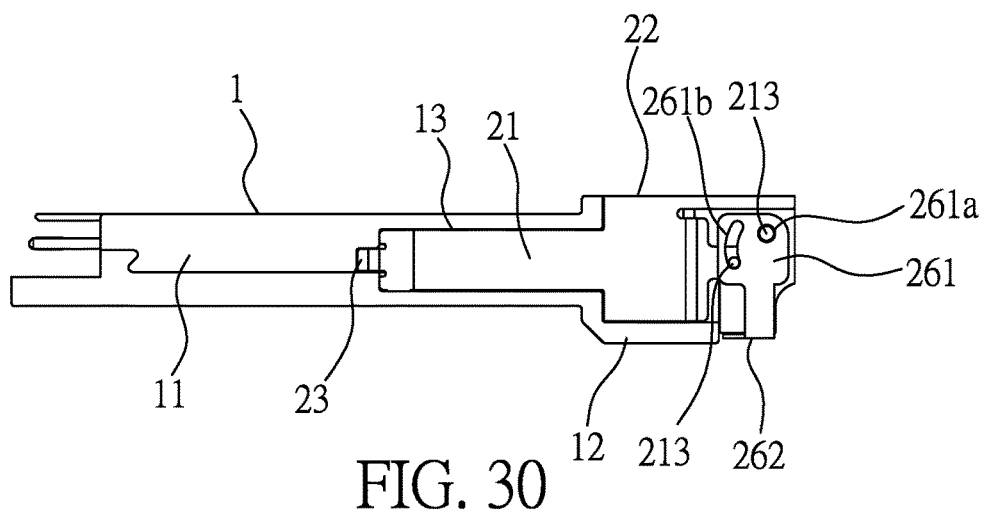
FIG. 30 is a side view illustrating the pull ring of FIG. 29 not being in an operating status according to the seventh embodiment of the present invention.
Figure 31:
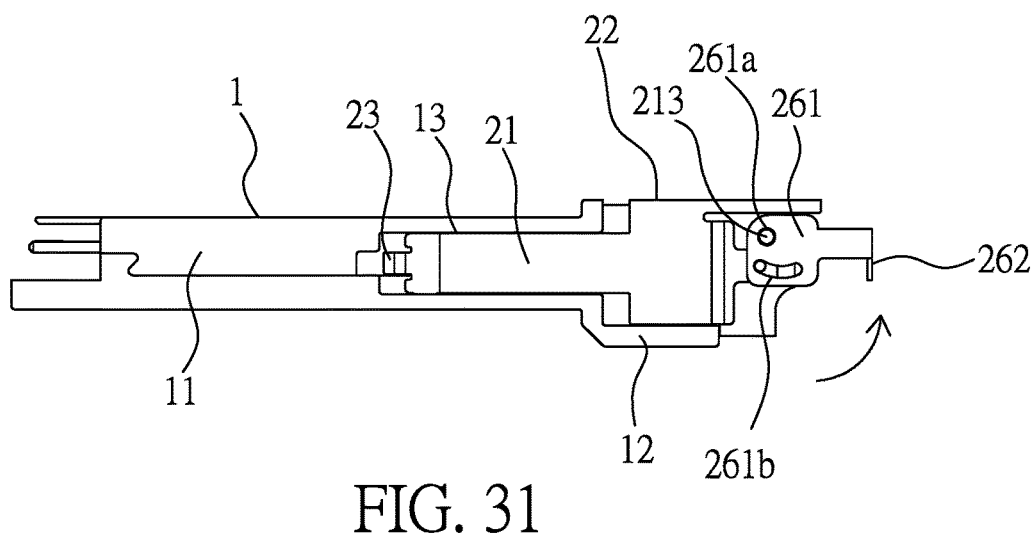
FIG. 31 is a side view illustrating the pull ring of FIG. 29 being in an operating status according to the seventh embodiment of the present invention.

According to the seventh embodiment, the technical feature disclosed in the second embodiment is adopted for illustrations, but a pull ring 26 is provided for replacing the pull handle 24 disclosed in the second embodiment. The pull ring 26 has a pair of support arms 261, and a push sheet 262 connected to the pair of support arms 261. The pair of support arms 261 have a pair of shaft holes 261*a* pivoted with a pair of pivotal shafts 111 of the pair of sidewalls 11, and a pair of arc-shaped elongated slots 261*b* sleeved on a pair of fastening shafts 213 at the front ends of the pair of extending arms 21. The pair of shaft holes 261*a* of the pair of support arms 261 are pivoted with the pair of pivotal shafts 111 of the pair of sidewalls 11, and the pair of arc-shaped elongated slots 261*b* are received at distal ends, for example bottom distal ends, of the pair of fastening shafts 213, thus after the above-mentioned components shown in FIG. 29 and FIG. 30 are assembled, the assembly of the optical fiber transceiver according to the seventh embodiment of the present invention is provided.

With a distance difference defined between each arc-shaped elongated slot 261*b* and two distal ends (for example top distal ends and bottom distal ends) of the fastening shaft 213; when the push sheet 262 of the pull ring 26 is operated, the pair of fastening shafts 213 are enabled to be rotated from the bottom distal end of the arc-shaped elongated slot 261*b* to the top distal end thereof, the sliding member 2 is pulled for be displaced towards a direction opposite to the connector socket 3, and the elastic locking sheet 31 is propped during a process of the unlocking flange 23 at the distal end of each extending arm 21 being displaced, thereby allowing the optical fiber transceiver to be removed from the connector socket 3.

Based on what has been disclosed above, advantages achieved by the present invention are as follows. A stable and precise positioning effect can be formed through the elastic member and the abutting unit, so that when the pair of elastic arms are displaced along the guiding parts for generating the energy storing or the energy releasing status, a situation of a conventional spring being jammed or released can be prevented, thus the production yield rate of the optical fiber transceiver can be greatly increased. Accordingly, the optical fiber transceiver provided by the present invention is novel and more practical in use comparing to prior art.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. An optical fiber transceiver, including:
   a cartridge, formed with two opposite sidewalls and a front end thereof disposed with an insertion part, wherein each of said sidewalls is transversally formed with a runner; and
   a sliding member, formed with a pair of extending arms inserted in a pair of said runners, wherein bottom ends defined at front portions of said pair of extending arms are connected via a connecting sheet, and rear ends thereof are protrudingly disposed with a pair of unlocking flanges; wherein, a top surface of said connecting sheet and a bottom surface of said insertion part are oppositely disposed with an elastic member and an abutting unit, two sides of said elastic member have a pair of elastic arms, and two sides of said abutting unit respectively have a guiding part symmetrically arranged and allowing each of said elastic arms to be in contact and displaced thereon, so that an energy storing status or an energy releasing status is formed during a process of said elastic member being displaced on said abutting unit;
   wherein said elastic member has a pair of L-shaped sheet members formed through a punching and bending means and arranged on said top surface of said connecting sheet, each of said L-shaped sheet members has an elastic arm extended in a direction towards an outer side of said connecting sheet, and a bending sheet connected to an inner end of said connecting sheet; said abutting unit is a trapezoid protrusion protruded from said bottom surface of said insertion part, two sides of said trapezoid protrusion are symmetrically and obliquely formed with a guiding part respectively for allowing each of said pair of elastic arms to be in contact, and each of said guiding part is a guiding inclined surface.

2. The optical fiber transceiver as claimed in claim 1, wherein each of said pair of extending arms is longitudinally and protrudingly formed with a stopping sheet, and said runner is concavely formed with a position limiting slot at a location corresponding to said stopping sheet and served to allow said stopping sheet to be inserted, so that an outward-displacing unlocking stroke or an inward-displacing locking stroke of said sliding member relative to said cartridge is defined.

3. The optical fiber transceiver as claimed in claim 1, wherein said insertion part is formed with at least one wire slot.

4. An optical fiber transceiver, including:
  a cartridge, formed with two opposite sidewalls and a front end thereof disposed with an insertion part, wherein each of said sidewalls is transversally formed with a runner; and
  a sliding member, formed with a pair of extending arms inserted in a pair of said runners, wherein bottom ends defined at front portions of said pair of extending arms are connected via a connecting sheet, and rear ends thereof are protrudingly disposed with a pair of unlocking flanges; wherein, a top surface of said connecting sheet and a bottom surface of said insertion part are oppositely disposed with an elastic member and an abutting unit, two sides of said elastic member have a pair of elastic arms, and two sides of said abutting unit respectively have a guiding part symmetrically arranged and allowing each of said elastic arms to be in contact and displaced thereon, so that an energy storing status or an energy releasing status is formed during a process of said elastic member being displaced on said abutting unit;
  wherein said elastic member has a U-shaped sheet member formed through a punching and bending means, said U-shaped sheet member has a pair of elastic arms extended in a direction towards an outer side of said connecting sheet, and a bending sheet connected to said pair of elastic arms, and a position limiting sheet is extended from said bending sheet in a direction towards said outer side of said connecting sheets; a bottom surface of said connecting sheet is formed with a position limiting slot at a location corresponding to said position limiting sheet; said position limiting sheet is received in said position limiting slot, thereby allowing said pair of elastic arms and said bending sheet to be protrudingly disposed on said top surface of said connecting sheet.

5. The optical fiber transceiver as claimed in claim 4, wherein a riveting, screwing or buckling means is adopted for enabling said position limiting sheet to be combined with and fastened in said position limiting slot.

6. The optical fiber transceiver as claimed in claim 5, wherein a front end and a rear end of said position limiting sheet are respectively formed with a first insertion sheet and a first insertion slot, and at least one buckle hook is disposed between said first insertion sheet and said first insertion slot; corresponding to locations of said first insertion sheet, said first insertion slot and said at least one buckle hook, a second insertion slot allowing said first insertion sheet to be inserted, a second insertion sheet for being received in said first insertion slot and at least one buckle slot allowing said at least one buckle hook to be buckled are respectively formed in said position limiting slot, so that said position limiting sheet is able to be tightly disposed in said position limiting slot.

7. An optical fiber transceiver, including:
  a cartridge, formed with two opposite sidewalls and a front end thereof disposed with an insertion part, wherein each of said sidewalls is transversally formed with a runner; and
  a sliding member, formed with a pair of extending arms inserted in a pair of said runners, wherein bottom ends defined at front portions of said pair of extending arms are connected via a connecting sheet, and rear ends thereof are protrudingly disposed with a pair of unlocking flanges; wherein, a top surface of said connecting sheet and a bottom surface of said insertion part are oppositely disposed with an elastic member and an abutting unit, two sides of said elastic member have a pair of elastic arms, and two sides of said abutting unit respectively have a guiding part symmetrically arranged and allowing each of said elastic arms to be in contact and displaced thereon, so that an energy storing status or an energy releasing status is formed during a process of said elastic member being displaced on said abutting unit;
  wherein said elastic member is a W-shaped wire spring, two sides thereof are disposed with a pair of elastic arms extended in a direction towards an outer side of said connecting sheet, and a reverse-V-shaped wire spring for connecting said pair of elastic arms, and one connecting end of said reverse-V-shaped wire spring is formed with a sleeve ring; said top surface of said connecting sheet is protrudingly disposed with a sleeve tenon allowing said sleeve ring to be sleeved thereon, thereby allowing said elastic member to be combined with said connecting sheet; said abutting unit is a pair of wedge-shaped protrusions symmetrically arranged and protruded from said bottom surface of said insertion part, and inner sides of said pair of wedge-shaped protrusions are symmetrically and obliquely formed with a guiding part respectively for allowing each of said elastic arms to be in contact, and each of said guiding parts is a guiding inclined surface.

8. An optical fiber transceiver, including:
  a cartridge, formed with two opposite sidewalls and a front end thereof disposed with an insertion part, wherein each of said sidewalls is transversally formed with a runner; and
  a sliding member, formed with a pair of extending arms inserted in a pair of said runners, wherein bottom ends defined at front portions of said pair of extending arms are connected via a connecting sheet, and rear ends thereof are protrudingly disposed with a pair of unlocking flanges; wherein, a top surface of said connecting sheet and a bottom surface of said insertion part are oppositely disposed with an elastic member and an abutting unit, two sides of said elastic member have a pair of elastic arms, and two sides of said abutting unit respectively have a guiding part symmetrically arranged and allowing each of said elastic arms to be in contact and displaced thereon, so that an energy storing status or an energy releasing status is formed during a process of said elastic member being displaced on said abutting unit;

wherein said elastic member is a W-shaped wire spring, two sides thereof are disposed with a pair of elastic arms extended in a direction towards an inner side of said cartridge, and a reverse-V-shaped wire spring for connecting said pair of elastic arms, and one connecting end of said V-shaped wire spring is formed as a sleeve ring; said bottom surface of said insertion part is protrudingly disposed with a sleeve tenon allowing said sleeve ring to be sleeved thereon, thereby allowing said elastic member to be combined on said bottom surface of said insertion part; said abutting unit is a trapezoid protruding sheet integrally protruded from said connecting sheet and extended in a direction towards an inner side of said cartridge, and two sides defined on a top surface of said trapezoid protruding sheet are symmetrically and obliquely formed with a guiding part respectively for allowing each of said elastic arms to be in contact, and each of said guiding parts is a guiding inclined surface.

9. An optical fiber transceiver, including:

a cartridge, formed with two opposite sidewalls and a front end thereof disposed with an insertion part, wherein each of said sidewalls is transversally formed with a runner; and a sliding member, formed with a pair of extending arms inserted in a pair of said runners, wherein bottom ends defined at front portions of said pair of extending arms are connected via a connecting sheet, and rear ends thereof are protrudingly disposed with a pair of unlocking flanges; wherein, a top surface of said connecting sheet and a bottom surface of said insertion part are oppositely disposed with an elastic member and an abutting unit, two sides of said elastic member have a pair of elastic arms, and two sides of said abutting unit respectively have a guiding part symmetrically arranged and allowing each of said elastic arms to be in contact and displaced thereon, so that an energy storing status or an energy releasing status is formed during a process of said elastic member being displaced on said abutting unit;

wherein said elastic member is a V-shaped wire spring, two sides thereof are disposed with a pair of elastic arms extended in a direction towards an inner side of said connecting sheet, and a sleeve ring formed through being connected to a connecting end of said pair of elastic arms; said top surface of said connecting sheet is protruded with a sleeve tenon allowing said sleeve ring to be sleeved thereon, thereby allowing said elastic member to be combined with said connecting sheet; said abutting unit is a pair of elongated protrusions symmetrically arranged and protruded from said bottom surface of said insertion part, inner ends of said pair of elongated protrusions are symmetrically and obliquely formed with a guiding part respectively for allowing each of said elastic arms to be in contact, and each of said guiding parts is a guiding inclined surface.

10. An optical fiber transceiver, including:

a cartridge, formed with two opposite sidewalls and a front end thereof disposed with an insertion part, wherein each of said sidewalls is transversally formed with a runner; and a sliding member, formed with a pair of extending arms inserted in a pair of said runners, wherein bottom ends defined at front portions of said pair of extending arms are connected via a connecting sheet, and rear ends thereof are protrudingly disposed with a pair of unlocking flanges; wherein, a top surface of said connecting sheet and a bottom surface of said insertion part are oppositely disposed with an elastic member and an abutting unit, two sides of said elastic member have a pair of elastic arms, and two sides of said abutting unit respectively have a guiding part symmetrically arranged and allowing each of said elastic arms to be in contact and displaced thereon, so that an energy storing status or an energy releasing status is formed during a process of said elastic member being displaced on said abutting unit;

wherein said elastic member is a V-shaped wire spring, two sides thereof are disposed with a pair of elastic arms extended in a direction towards a front end of said cartridge, and a sleeve ring formed through being connected to a connecting end of said pair of elastic arms; said bottom surface of said insertion part is protruded with a sleeve tenon allowing said sleeve ring to be sleeved thereon, thereby allowing said elastic member to be combined on said bottom surface of said insertion part; said abutting unit is a guiding part protruded from a top surface of said connecting sheet for allowing each of said elastic arms to be in contact, and each of said guiding parts is a guiding column.

11. The optical fiber transceiver as claimed in claim 1, wherein front ends of said pair of extending arms are disposed with a pull handle.

12. The optical fiber transceiver as claimed in claim 11, wherein said pull handle is made of a polymer material, and a front portion of each of said extending arms is formed with at least one coupling hole, said pull handle is formed at said front end of each of said extending arms via an injection embedding means, and embedded in said at least one coupling hole.

13. The optical fiber transceiver as claimed in claim 1, wherein front ends of said pair of extending arms are further disposed with a pull ring, said pull ring has a pair of support arms, and a push sheet connected to said pair of support arms, said pair of support arms have a pair of shaft holes pivoted with a pair of pivotal shafts of said pair of sidewalls, and a pair of arc-shaped elongated slots sleeved on a pair of fastening shafts at said front ends of said pair of extending arms; with a distance difference defined between each of said arc-shaped elongated slots and a top distal end and a bottom distal end of said corresponding fastening shaft; when said push sheet of said pull ring is operated, said pair of fastening shafts are enabled to be rotated from said bottom distal end of said pair of arc-shaped elongated slots to said top distal end thereof, said sliding member is pulled for be displaced towards a direction opposite to a connector socket, and an elastic locking sheet is propped during a process of said unlocking flange at said distal end of each of said extending arms being displaced, thereby allowing said optical fiber transceiver to be removed from said connector socket.

14. The optical fiber transceiver as claimed in claim 4, wherein each of said pair of extending arms is longitudinally and protrudingly formed with a stopping sheet, and said runner is concavely formed with a position limiting slot at a location corresponding to said stopping sheet and served to allow said stopping sheet to be inserted, so that an outward-displacing unlocking stroke or an inward-displacing locking stroke of said sliding member relative to said cartridge is defined.

15. The optical fiber transceiver as claimed in claim 4, wherein said insertion part is formed with at least one wire slot.

16. The optical fiber transceiver as claimed in claim 4, wherein front ends of said pair of extending arms are disposed with a pull handle.

17. The optical fiber transceiver as claimed in claim 16, wherein said pull handle is made of a polymer material, and a front portion of each of said extending arms is formed with at least one coupling hole, said pull handle is formed at said front end of each of said extending arms via an injection embedding means, and embedded in said at least one coupling hole.

18. The optical fiber transceiver as claimed in claim 4, wherein front ends of said pair of extending arms are further disposed with a pull ring, said pull ring has a pair of support arms, and a push sheet connected to said pair of support arms, said pair of support arms have a pair of shaft holes pivoted with a pair of pivotal shafts of said pair of sidewalls, and a pair of arc-shaped elongated slots sleeved on a pair of fastening shafts at said front ends of said pair of extending arms; with a distance difference defined between each of said arc-shaped elongated slots and a top distal end and a bottom distal end of said corresponding fastening shaft; when said push sheet of said pull ring is operated, said pair of fastening shafts are enabled to be rotated from said bottom distal end of said pair of arc-shaped elongated slots to said top distal end thereof, said sliding member is pulled for be displaced towards a direction opposite to a connector socket, and an elastic locking sheet is propped during a process of said unlocking flange at said distal end of each of said extending arms being displaced, thereby allowing said optical fiber transceiver to be removed from said connector socket.

19. The optical fiber transceiver as claimed in claim 7, wherein each of said pair of extending arms is longitudinally and protrudingly formed with a stopping sheet, and said runner is concavely formed with a position limiting slot at a location corresponding to said stopping sheet and served to allow said stopping sheet to be inserted, so that an outward-displacing unlocking stroke or an inward-displacing locking stroke of said sliding member relative to said cartridge is defined.

20. The optical fiber transceiver as claimed in claim 7, wherein said insertion part is formed with at least one wire slot.

21. The optical fiber transceiver as claimed in claim 7, wherein front ends of said pair of extending arms are disposed with a pull handle.

22. The optical fiber transceiver as claimed in claim 21, wherein said pull handle is made of a polymer material, and a front portion of each of said extending arms is formed with at least one coupling hole, said pull handle is formed at said front end of each of said extending arms via an injection embedding means, and embedded in said at least one coupling hole.

23. The optical fiber transceiver as claimed in claim 7, wherein front ends of said pair of extending arms are further disposed with a pull ring, said pull ring has a pair of support arms, and a push sheet connected to said pair of support arms, said pair of support arms have a pair of shaft holes pivoted with a pair of pivotal shafts of said pair of sidewalls, and a pair of arc-shaped elongated slots sleeved on a pair of fastening shafts at said front ends of said pair of extending arms; with a distance difference defined between each of said arc-shaped elongated slots and a top distal end and a bottom distal end of said corresponding fastening shaft; when said push sheet of said pull ring is operated, said pair of fastening shafts are enabled to be rotated from said bottom distal end of said pair of arc-shaped elongated slots to said top distal end thereof, said sliding member is pulled for be displaced towards a direction opposite to a connector socket, and an elastic locking sheet is propped during a process of said unlocking flange at said distal end of each of said extending arms being displaced, thereby allowing said optical fiber transceiver to be removed from said connector socket.

24. The optical fiber transceiver as claimed in claim 8, wherein each of said pair of extending arms is longitudinally and protrudingly formed with a stopping sheet, and said runner is concavely formed with a position limiting slot at a location corresponding to said stopping sheet and served to allow said stopping sheet to be inserted, so that an outward-displacing unlocking stroke or an inward-displacing locking stroke of said sliding member relative to said cartridge is defined.

25. The optical fiber transceiver as claimed in claim 8, wherein said insertion part is formed with at least one wire slot.

26. The optical fiber transceiver as claimed in claim 8, wherein front ends of said pair of extending arms are disposed with a pull handle.

27. The optical fiber transceiver as claimed in claim 26, wherein said pull handle is made of a polymer material, and a front portion of each of said extending arms is formed with at least one coupling hole, said pull handle is formed at said front end of each of said extending arms via an injection embedding means, and embedded in said at least one coupling hole.

28. The optical fiber transceiver as claimed in claim 8, wherein front ends of said pair of extending arms are further disposed with a pull ring, said pull ring has a pair of support arms, and a push sheet connected to said pair of support arms, said pair of support arms have a pair of shaft holes pivoted with a pair of pivotal shafts of said pair of sidewalls, and a pair of arc-shaped elongated slots sleeved on a pair of fastening shafts at said front ends of said pair of extending arms; with a distance difference defined between each of said arc-shaped elongated slots and a top distal end and a bottom distal end of said corresponding fastening shaft; when said push sheet of said pull ring is operated, said pair of fastening shafts are enabled to be rotated from said bottom distal end of said pair of arc-shaped elongated slots to said top distal end thereof, said sliding member is pulled for be displaced towards a direction opposite to a connector socket, and an elastic locking sheet is propped during a process of said unlocking flange at said distal end of each of said extending arms being displaced, thereby allowing said optical fiber transceiver to be removed from said connector socket.

29. The optical fiber transceiver as claimed in claim 9, wherein each of said pair of extending arms is longitudinally and protrudingly formed with a stopping sheet, and said runner is concavely formed with a position limiting slot at a location corresponding to said stopping sheet and served to allow said stopping sheet to be inserted, so that an outward-displacing unlocking stroke or an inward-displacing locking stroke of said sliding member relative to said cartridge is defined.

30. The optical fiber transceiver as claimed in claim 9, wherein said insertion part is formed with at least one wire slot.

31. The optical fiber transceiver as claimed in claim 9, wherein front ends of said pair of extending arms are disposed with a pull handle.

32. The optical fiber transceiver as claimed in claim 31, wherein said pull handle is made of a polymer material, and a front portion of each of said extending arms is formed with at least one coupling hole, said pull handle is formed at said front end of each of said extending arms via an injection embedding means, and embedded in said at least one coupling hole.

33. The optical fiber transceiver as claimed in claim 9, wherein front ends of said pair of extending arms are further disposed with a pull ring, said pull ring has a pair of support arms, and a push sheet connected to said pair of support arms, said pair of support arms have a pair of shaft holes pivoted with a pair of pivotal shafts of said pair of sidewalls, and a pair of arc-shaped elongated slots sleeved on a pair of fastening shafts at said front ends of said pair of extending arms; with a distance difference defined between each of said arc-shaped elongated slots and a top distal end and a bottom distal end of said corresponding fastening shaft; when said push sheet of said pull ring is operated, said pair of fastening shafts are enabled to be rotated from said bottom distal end of said pair of arc-shaped elongated slots to said top distal end thereof, said sliding member is pulled for be displaced towards a direction opposite to a connector socket, and an elastic locking sheet is propped during a process of said unlocking flange at said distal end of each of said extending arms being displaced, thereby allowing said optical fiber transceiver to be removed from said connector socket.

34. The optical fiber transceiver as claimed in claim 10, wherein each of said pair of extending arms is longitudinally and protrudingly formed with a stopping sheet, and said runner is concavely formed with a position limiting slot at a location corresponding to said stopping sheet and served to allow said stopping sheet to be inserted, so that an outward-displacing unlocking stroke or an inward-displacing locking stroke of said sliding member relative to said cartridge is defined.

35. The optical fiber transceiver as claimed in claim 10, wherein said insertion part is formed with at least one wire slot.

36. The optical fiber transceiver as claimed in claim 10, wherein front ends of said pair of extending arms are disposed with a pull handle.

37. The optical fiber transceiver as claimed in claim 36, wherein said pull handle is made of a polymer material, and a front portion of each of said extending arms is formed with at least one coupling hole, said pull handle is formed at said front end of each of said extending arms via an injection embedding means, and embedded in said at least one coupling hole.

38. The optical fiber transceiver as claimed in claim 10, wherein front ends of said pair of extending arms are further disposed with a pull ring, said pull ring has a pair of support arms, and a push sheet connected to said pair of support arms, said pair of support arms have a pair of shaft holes pivoted with a pair of pivotal shafts of said pair of sidewalls, and a pair of arc-shaped elongated slots sleeved on a pair of fastening shafts at said front ends of said pair of extending arms; with a distance difference defined between each of said arc-shaped elongated slots and a top distal end and a bottom distal end of said corresponding fastening shaft; when said push sheet of said pull ring is operated, said pair of fastening shafts are enabled to be rotated from said bottom distal end of said pair of arc-shaped elongated slots to said top distal end thereof, said sliding member is pulled for be displaced towards a direction opposite to a connector socket, and an elastic locking sheet is propped during a process of said unlocking flange at said distal end of each of said extending arms being displaced, thereby allowing said optical fiber transceiver to be removed from said connector socket.

* * * * *